(12) United States Patent
Watanabe et al.

(10) Patent No.: US 8,154,661 B2
(45) Date of Patent: Apr. 10, 2012

(54) VIDEO DEVICE, OUTPUT SWITCHING METHOD FOR VIDEO DEVICE, AND CABLE DISCRIMINATING METHOD

(75) Inventors: Hiroyuki Watanabe, Kanagawa (JP); Makio Niwa, Kanagawa (JP)

(73) Assignee: Sony Corporation, Tokyo (JP)

(*) Notice: Subject to any disclaimer, the term of this patent is extended or adjusted under 35 U.S.C. 154(b) by 772 days.

(21) Appl. No.: 12/260,175

(22) Filed: Oct. 29, 2008

(65) Prior Publication Data
US 2009/0109336 A1    Apr. 30, 2009

(30) Foreign Application Priority Data
Oct. 31, 2007   (JP) ................... P2007-284045

(51) Int. Cl.
*H04N 5/46* (2006.01)
(52) U.S. Cl. .......... 348/558; 348/556; 348/706
(58) Field of Classification Search .......... 348/552–559, 348/705, 706
See application file for complete search history.

(56) References Cited

U.S. PATENT DOCUMENTS

| | | | |
|---|---|---|---|
| 6,798,458 B1 * | 9/2004 | Unemura | 348/448 |
| 2006/0195627 A1 * | 8/2006 | Cole et al. | 710/15 |

FOREIGN PATENT DOCUMENTS

| | | | |
|---|---|---|---|
| CN | 2535810 Y | | 2/2003 |
| JP | 63 229025 | | 9/1988 |
| JP | 6 326916 | | 11/1994 |
| JP | 2001 346760 | | 12/2001 |
| JP | 2004 56719 | | 2/2004 |
| JP | 2004 77506 | | 3/2004 |
| JP | 2005 101865 | | 4/2005 |
| JP | 2007006150 A | * | 1/2007 |
| JP | 2007 82138 | | 3/2007 |

* cited by examiner

*Primary Examiner* — Michael Lee
(74) *Attorney, Agent, or Firm* — Frommer Lawrence & Haug LLP; William S. Frommer; Thomas F. Presson

(57) ABSTRACT

A video device comprises: a video signal processor generating a standard definition video signal at least having a composite signal and a high definition component video signal; an outputting unit outputting the standard definition video signal or the high definition component video signal to a cable to be connected; a discriminating unit discriminating a kind of cable connected to the outputting unit; and a switch allowing the outputting unit to selectively output the standard definition video signal and the high definition component video signal on the basis of the discrimination result of the discriminating unit. When the discriminating unit determines that the cable connected to the outputting unit is a cable for a high definition signal, the switch allows the outputting unit to output the high definition component video signal.

11 Claims, 18 Drawing Sheets

| PIN NO | PIN NAME |
|---|---|
| 10 | Y |
| 9 | Pr |
| 5 | Pb |
| 1 | AUDIO_L |
| 6 | AUDIO_R |
| 7 | Plug_ID |
| 2 | (LANC SIG) |
| 4 | (LANC DC) |
| 3 | VIDEO_GND |
| 8 | AUDIO_GND |

| PIN NO | PIN NAME |
|---|---|
| 10 | S-Y |
| 9 | VIDEO |
| 5 | S-C |
| 1 | AUDIO_L |
| 6 | AUDIO_R |
| 7 | Plug_ID |
| 2 | (LANC SIG) |
| 4 | (LANC DC) |
| 3 | Y,C_GND |
| 8 | AUDIO_GND |

FIG.13

| PIN | CABLE FOR SD VIDEO SIGNAL | | CABLE FOR HD VIDEO SIGNAL | |
|---|---|---|---|---|
| 10 | VIDEO COMPOSITE | S-Y I/O | | Y |
| 9 | | VIDEO I/O | VIDEO COMPOSITE | Pr |
| 5 | | S-C I/O | | Pb |
| 1 | AUDIO | L | AUDIO | L |
| 6 | | R | | R |
| 7 | PLUG ID | 0Ω | PLUG ID | 33kΩ |
| 2 | NC (NOT CONNECTION) | (LANC SIG) | NC (NOT CONNECTION) | (LANC SIG) |
| 4 | | (LANC DC) | | (LANC DC) |
| 3 | Y,C GND | | VIDEO GND | |
| 8 | L,R,V GND | | AY GND | |

VIDEO DEVICE, OUTPUT SWITCHING METHOD FOR VIDEO DEVICE, AND CABLE DISCRIMINATING METHOD

CROSS REFERENCES TO RELATED APPLICATIONS

The present invention contains subject matter related to Japanese Patent Application JP 2007-284045 filed in the Japanese Patent Office on Oct. 31, 2007, the entire contents of which being incorporated herein by reference.

BACKGROUND OF THE INVENTION

1. Field of the Invention

The present invention relates to a video device that is capable of discriminating the kind of cable connected to an output device, such as a video camera, an output switching method for a video device, and a cable discriminating method.

2. Description of the Related Art

An example of a video camera device such as a video device includes an HD video camera device that is capable of capturing images having high definition, and an SD video camera device that is capable of capturing images having standard definition.

The HD video camera device is provided with an output unit so that a captured image is output on a monitor such as a television receiver. Specifically, the HD video camera device is provided with an A/V output terminal that outputs a standard definition video signal (SD video signal) composed of a brightness signal S-Y, a color signal S-C, and a composite signal VIDEO and an audio signal having an R channel and an L channel, and a component output terminal that outputs a high definition component video signal (HD video signal) composed of a brightness signal Y, a first color signal Cb/Pb, and a second color signal Cr/Pr.

According to a first method that connects the HD video camera device with the monitor, a cable is connected with the A/V output terminal. In this case, one cable is used to output the SD video signal to the monitor device, display an SD definition video on the monitor device, and output an audio. Further, according to a second method, the cable is connected with the component output terminal. In this case, a cable for a video is connected with the component output terminal and a cable for an audio is connected with the A/V output terminal. Further, two cables are used to display the HD video signal on the monitor to output an audio.

However, there is a growing demand to reduce the number of element in the video camera device and reduce its size. Therefore, one jack is used for the output unit of the video camera device to serve as the A/V output and component output terminal. But, for the A/V output and component output terminals, when a terminal for the A/V output terminal and a terminal for the component output terminal are provided so as to correspond to the terminal for the composite video signal, the number of terminals is increased, which subsequently also increases the number of jacks for the A/V output and component output terminals.

Further, the SD video camera device includes only an A/V output terminal that is capable of outputting the SD image signal composed of the brightness signal S-Y, the color signal S-C, and the composite signal VIDEO and the audio signal having the R channel and the L channel, which is different from the HD video camera device. In contrast, even though the HD video camera device is provided with the A/V output and component output terminals, the HD video camera device has only one jack, which looks similar to the A/V output terminal of the SD video camera device.

However, since the HD video signal has a broader band than the SD video signal, a broadband cable is used for a cable that is connected to the component output terminal, which is different from the A/V output terminal. Further, the cable for the HD video signal is connected to an HD monitor device, and the cable for the SD video signal is connected to an SD monitor device. Therefore, in the case where the output unit of the HD video camera device is used as the A/V output and component output terminal, when the HD video camera device outputs the SD video signal, the cable may be undesirably connected to the component input terminal of the HD monitor device. In this case, in the HD monitor device, the SD video signal that is output from the HD video camera device is incorrectly displayed on the monitor. Likewise, when the output unit of the SD video camera device is connected to the component input terminal of the HD monitor device, the SD video signal output from the SD video camera device is incorrectly displayed on the monitor.

As a result, in the HD video camera device, when the terminal for the A/V output terminal and the component output terminal are commonly used, that is, one jack is shared for both terminals, it is preferable that the kind of cable that is connected to the output terminal is discriminated and a video signal to be output is changed accordingly. Further, in the SD video camera device, when the A/V output terminal is incorrectly connected to the component input terminal of the monitor, it is preferable to display a warning.

SUMMARY OF THE INVENTION

It is preferable to provide a video device, an output switching method for a video device that is capable of reducing the number of elements while reducing the size of the entire device by using one output unit, such as a jack, when both a standard definition video signal and a high definition component video signal are output.

It is further preferable to provide a video device, and an output switching method for a video device that is capable of minimizing an output unit when the number of output unit provided in a main body of a device is one.

Furthermore, it is preferable to provide a video device and a cable discrimination method that is capable of outputting a correct video signal by discriminating a kind of cables.

It is preferable to provide a video deice and a cable discrimination method that when the kind of cable is discriminated and the kind of cable is not correct, issues a notice to a user that it is incorrect.

A video device according to an exemplary embodiment includes: a video signal processing unit generating a standard definition video signal at least having a composite signal and a high definition component video signal; an outputting unit that outputs the standard definition video signal or the high definition component video signal to a cable to be connected; a discriminating unit that discriminates a kind of cable connected to the outputting unit; and a switching unit that allows the outputting unit to selectively output either the standard definition video signal or the high definition component video signal on the basis of the discrimination result of the discriminating unit. When the discriminating unit discriminates that the cable connected to the outputting unit is a cable for a high definition signal, the switching unit allows the outputting unit to output the high definition component video signal.

An output switching method according to an exemplary embodiment discriminates the kind of cable connected to an outputting unit to selectively output either a standard definition video signal at least having a composite signal generated by a video signal processing unit or a high definition component video signal. The method includes allowing a discriminating unit to discriminate the kind of cable connected to the outputting unit; and when the discriminating unit discriminates that the cable connected to the outputting unit is a high definition cable, switching the outputting unit to output the high definition video signal.

A video device according to another exemplary embodiment includes a standard definition video signal processing unit that generates a standard definition video signal configured to have a brightness signal, a color signal, and a composite signal; an outputting unit that outputs the standard definition video signal to a cable to be connected; a discriminating unit that discriminates a kind of cable connected to the outputting unit; and a warning unit that outputs warning data when an incorrect cable is connected to the outputting unit. When the discriminating unit discriminates that the cable connected to the outputting unit is an incorrect cable, the warning unit may output the warning data.

A cable discriminating method according to still another embodiment allows an outputting unit to output a standard definition video signal configured to have a brightness signal, a color signal, and a composite signal generated in a standard definition video signal processing unit and discriminates the kind of cable connected to the outputting unit. The method includes: discriminating the kind of cable connected to the outputting unit; and outputting warning data when an incorrect cable is connected to the outputting unit.

According to the embodiments of the invention, the kind of cable connected to the outputting unit is discriminated by the discriminating unit. When the discriminating unit discriminates that the cable connected to the outputting unit is a cable for a high definition video signal, the outputting unit is switched so as to output the high definition video signal. Therefore, when the standard definition video signal and the high definition component video signal are output, one outputting unit such as a jack needs to be used. As a result, it is possible to reduce the number of components while reducing the size of the entire device. Further, since the interface of the outputting unit is the same as the video device according to the related art, it is further possible to prevent the outputting unit from increasing in size. Furthermore, it is possible to correctly output a video signal according to the kind of cable.

According to the exemplary embodiment, when the kind of cable connected to the outputting unit is discriminated and the discriminating unit discriminates that the incorrect cable is connected to the outputting unit, warning data is output. Therefore, it is possible to issue the notice that the incorrect cable is connected to user.

BRIEF DESCRIPTION OF THE DRAWINGS

Embodiments of the present invention will be described in detail based on the following figures, wherein:

FIG. 13 is a diagram showing the pin arrangement of a jack of an HD video camera device;

DETAILED DESCRIPTION OF THE PREFERRED EMBODIMENTS

Hereafter, an exemplary embodiment of the present invention in which a video camera device and a monitor are connected by a cable will be described in detail with reference to the accompanying drawings.

Figure 1:
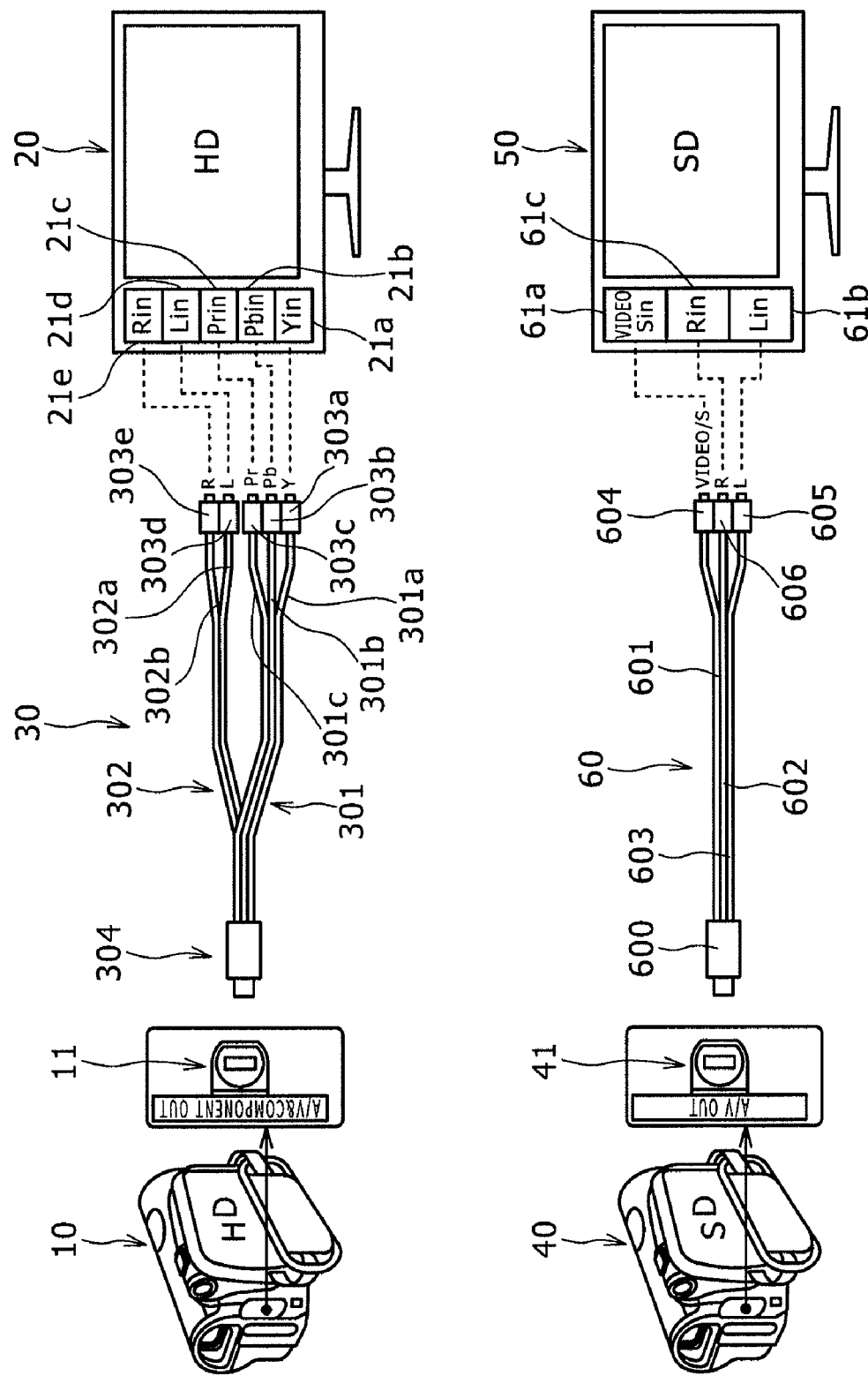
FIG. 1 is a diagram showing a display system of an HD video signal and an SD video signal to which an embodiment of the invention is applied.

FIG. 1 shows a state when an HD video camera device 10 is connected to an HD monitor device 20 by a cable connection device 30. In this case, the HD video camera device 10 captures a video having high definition, and the HD monitor device 20 displays the high definition video signal (hereinafter, referred to as HD video signal). Further, the cable connection device 30 is used to transmit the HD video signal. FIG. 1 also shows a state when an SD video camera device 40 is connected to an SD monitor device 50 by a cable connection device 60. In this case, the SD video camera device 40 captures a video having standard definition, and the SD monitor device 50 displays the standard definition video signal (hereinafter, referred to as SD video signal). Further, the cable connection device 60 is used to transmit the SD video signal. The HD video camera device 10 that is capable of capturing a video with a high definition can also output an SD video signal. In this case, the HD video camera device 10 can be connected to the SD monitor device 50 using the cable connection device 60.

As described above, the HD video camera device 10 can output the HD video signal and the SD video signal. Therefore, the cable connection device 30 for an HD video signal and the cable connection device 60 for an SD video signal can be selectively connected according to the kind of video signal to be output.

Further, in order to reduce the size of the device, the HD video camera device 10 uses one jack 11 to which the cable connection device 30 for the HD video signal and the cable connection device 60 for the SD video signal are connected. Therefore, the cable connection device 30 for the HD video signal and the cable connection device 60 for the SD video signal use the same plug. Since the plug of the cable connection device 30 for the HD video signal and the plug of the cable connection device 60 for the SD video signal have the same shape, when the HD video signal is output from the HD video camera device 10, the cable connection device 60 for the SD video signal may be incorrectly connected, or when the SD video signal is output, the cable connection device 30 for the HD video signal may be incorrectly connected. Therefore, the HD video camera device 10 is configured such that the kind of connected cable connection device is discriminated and an HD video signal or an SD video signal corresponding to the connected cable connection device is output.

In the case of the SD video camera device 40, because the plug of the cable connection device 30 for the HD video signal and the plug of the cable connection device 60 for the SD video signal have the same shape, the cable connection device 30 for the HD video signal may be incorrectly connected. Therefore, in the SD video camera device 40, the kind of connected cable connection device is discriminated so that when the cable connection device 30 for the HD video signal is incorrectly connected, a warning that the cable is incorrectly connected is issued to a viewfinder or a monitor of the SD video camera device 40. Further, as compared with the SD video camera according to the related art that does not discriminate the kind of connected cable connection device, even when the cable connection device 30 for the HD video signal is connected, a display that notifies the warning, for example, a red screen is displayed on a viewfinder or a monitor of the HD monitor device 20 or the SD video camera device 40.

The discrimination of the kind of connected cable that is performed in the HD video camera device 10 or the SD video camera device 40 is performed by an ID that is mounted in the plug. The details will be described below. The plug of the cable connection device 30 for the HD video signal is provided with a resistive element that distinguishes the cable connection device 60 for the SD video signal or different kind of cables. The HD video camera device 10 or the SD video camera device 40 detects the resistance to discriminate the kind of cable.

(1) Description of Cable Connection Device 30 for HD Video Signal

Figure 2A:
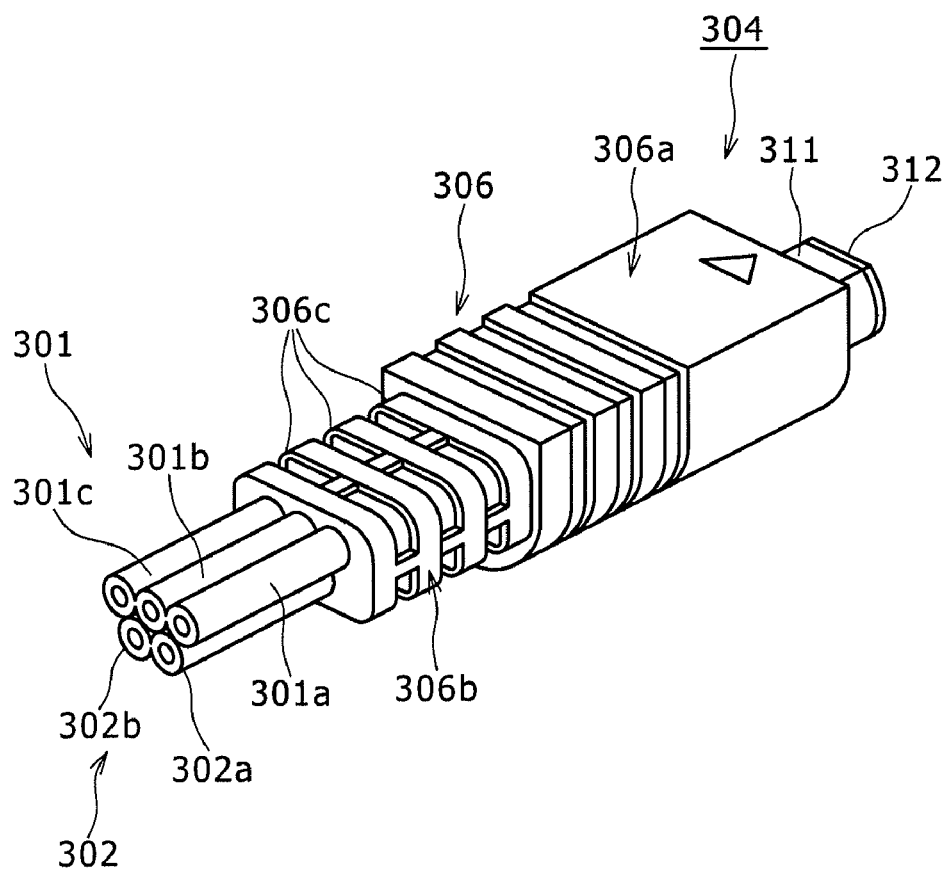
FIG. 2A is a perspective view showing a multiplug of a cable connection device for an HD video signal seen from the rear side.
Figure 2B:
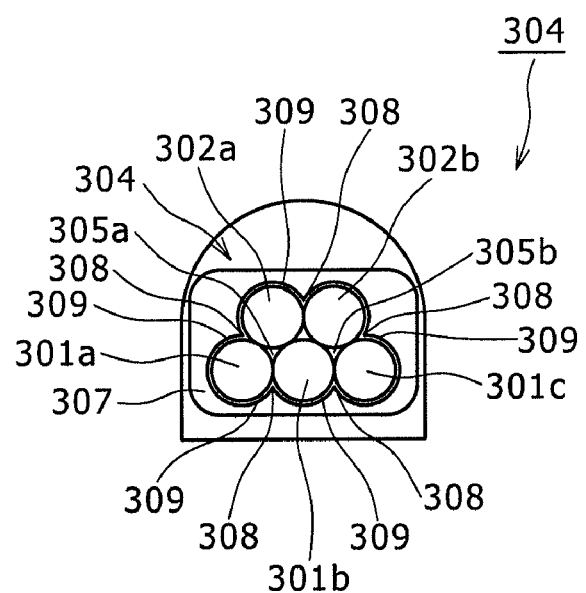
FIG. 2B is a rear side view of FIG. 2A.
Figure 3:
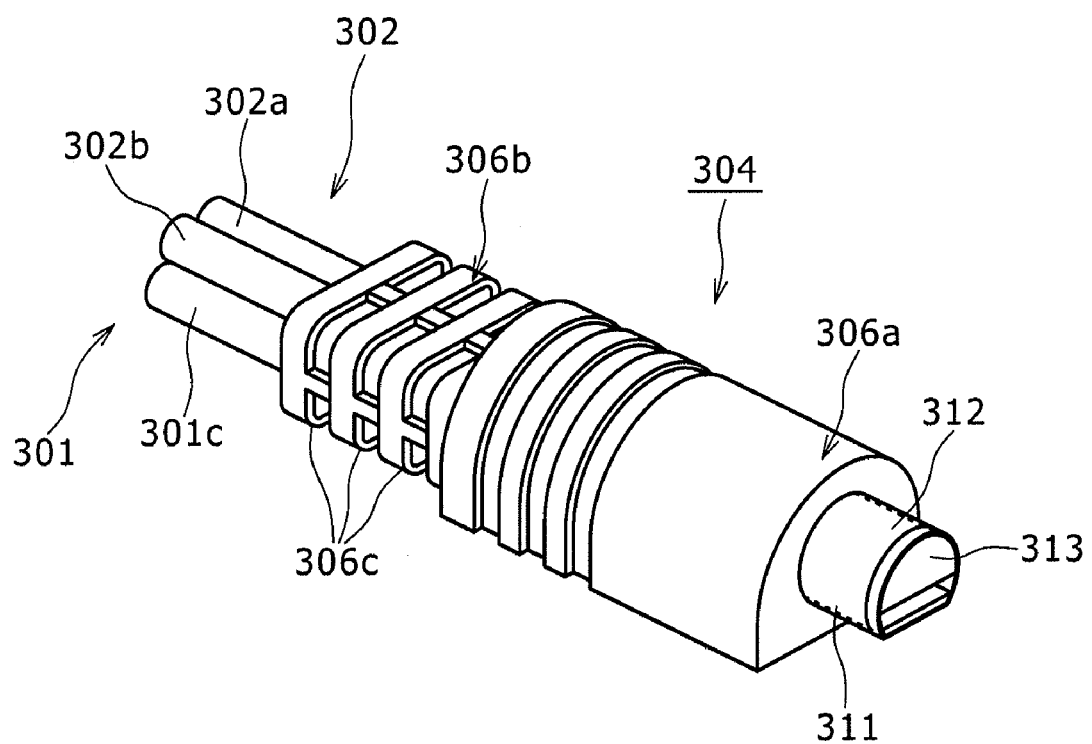
FIG. 3 is a perspective view showing the multiplug of the cable connection device for an HD video signal seen from the front side.

As shown in FIGS. 1 to 3, the cable connection device 30 that is used to connect the HD video camera device 10 and the HD monitor device 20 is cable that is used to transmits the HD video signal. The cable connection device 30 includes a first triplex cable complex 301 in which three cables, that is, first to third cables 301a, 301b, and 301c are integrally molded in one line, and a second duplex cable complex 302 in which two cables, that is, fourth and fifth cables 302a and 302b are integrally molded in one line. The HD video signal is transmitted through the first cable complex 301, and an audio signal is transmitted through the second cable complex 302.

The first cable complex 301 transmits the HD video signal, and uses a cable having a broader band than that of a cable of the cable connection device 60 that transmits the SD video signal by taking a consideration that the bandwidth of the HD video signal is larger than that of the SD video signal. Specifically, the HD video signal is a component video signal configured to have a brightness signal Y, a first color signal Pb, and a second color signal Pr. The first cable 301a of the first cable complex 301 transmits the brightness signal Y, the second cable 301b transmits the first color signal Pb, and the third cable 301c transmits the second color signal Pr.

Further, the fourth cable 302a of the second cable complex 302 transmits an audio signal of an L channel, and the fifth cable 302b transmits an audio signal of an R channel.

The above-described first cable complex 301 and second cable complex 302 are provided with a multiplug 304 at a side to which the jack 11 of the HD video camera device 10 is connected. The first cable complex 301 and the second cable complex 302 are integrally formed by the multiplug 304. Further, the first cable complex 301 and the second cable complex 302 are provided with an RCA plug 303 at a side to which the HD monitor device 20 is connected. That is, as shown in FIG. 1, in the case of RCA, the first to third cables 301a, 301b, and 301c of the first cable complex 301 are separated from each other. In this case, the first cable 301a is provided with a Y plug 303a, the second cable 301b is provided with a Pb plug 303b, and the third cable 301c is provided with a Pr plug 303c. Moreover, the fourth and fifth cables 302a and 302b of the second cable complex 302 are separated from each other, and the fourth cable 302a is provided with an L-channel audio plug 303d, and the fifth cable 302b is provided with an R-channel audio plug 303e.

The multiplug 304 integrates the first cable complex 301 and the second cable complex 302 at a side to which the jack 11 of the HD video camera device 10 is connected. In this case, as shown in FIG. 2B, the first triplex cable complex 301 and the second duplex cable complex 302 are arranged to be integrated by the multiplug 304 such that the fourth and fifth cables 302a and 302b of the second cable complex 302 are disposed at a first valley 305a formed between the first cable 301a and the second cable 301b and a second valley 305b formed between the second cable 301b and the third cable 301c of the first cable complex 301 that faces the second cable complex 302. As shown in FIG. 2B, the first cable complex 301 and the second cable complex 302 are stacked, which reduces the width of the multiplug 304 of the cable connection device 30 as compared with five cables that are stacked in a line. For example, the external shape has approximately 10 mm×10 mm (length×width), which allows the reduction in size.

Further, around the rear side of the multiplug 304 through which the first cable complex 301 and the second cable complex 302 are led, as shown in FIG. 2B, a support 307 that supports around the first cable complex 301 and the second cable complex 302 is provided.

When the first cable complex 301 and the second cable complex 302 overlap as described above, a plurality of outer valleys 308 are formed outside the first and second cable complexes. On the support 307 that is formed around the rear side of the multiplug 403, stoppers 309 are continuously formed to close the substantially mountain shaped outer valleys 308. The stoppers 309 support the first cable complex 301 and the second cable complex 302, and prevent extraneous materials, such as dust, from entering into the multiplug 304. The first cable complex 301 and the second cable complex 302 are separated from each other when the cable complexes 301 and 302 are led from the multiplug 304 and flexibly displaced. The stopper 309 prevents the first cable complex 301 and the second cable complex 302 from excessively bending.

Therefore, as shown in FIGS. 2A to 4, the multiplug 304 is provided with a terminal member 311 to which the first to fifth cables 301a, 301b, 301c, 302a, and 302b are connected and a shell 312 that covers the terminal member 311 in a case 306.

Figure 4:
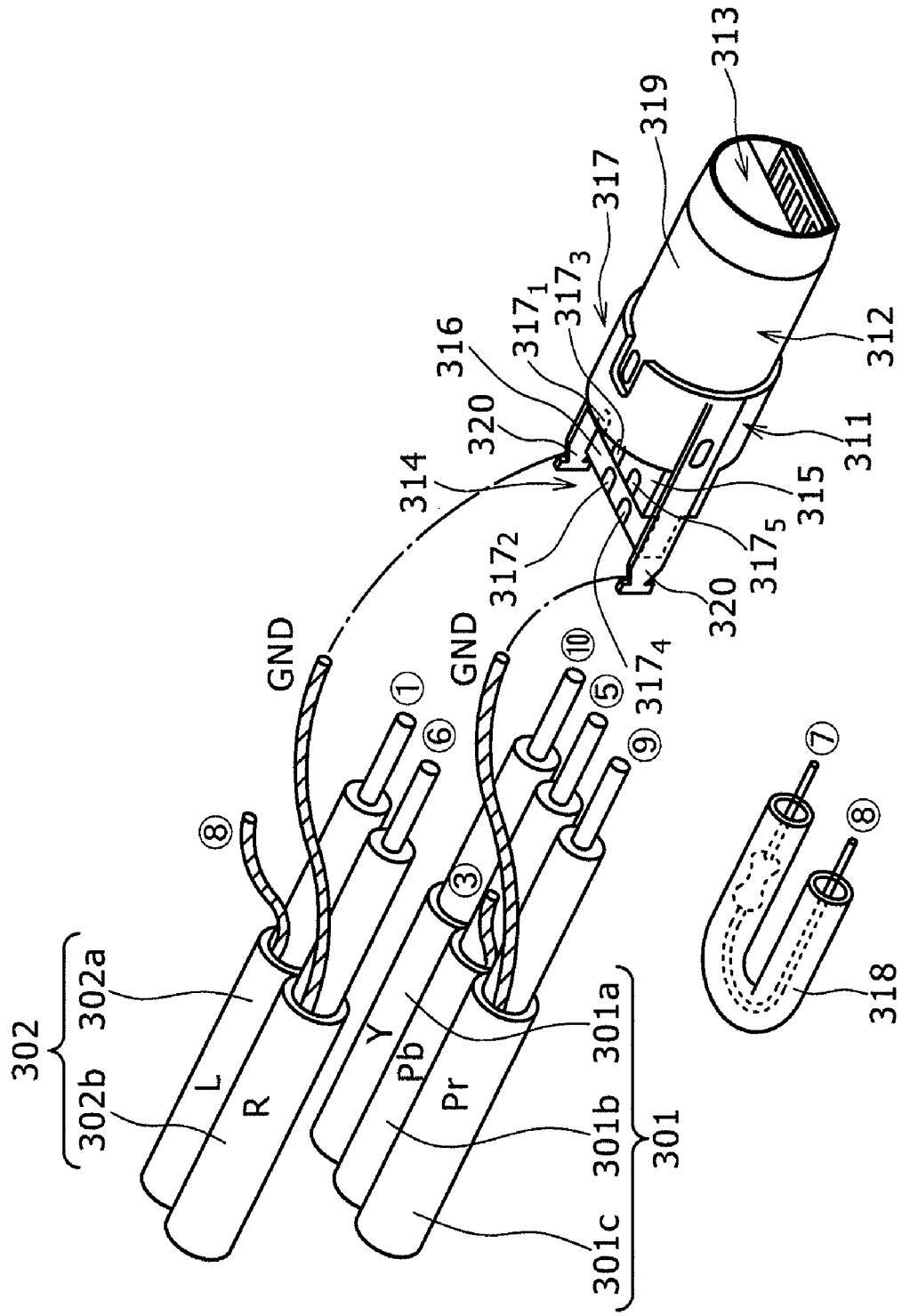
FIG. 4 is an exploded perspective view showing the multiplug of the cable connection device for an HD video signal.

The case 306 configures an external housing of the multiplug 304, and molded by PVC (polyvinyl chloride). The case 306 includes a main body 306a, and a leading unit 306b through which the first cable complex 301 and the second cable complex 302 are led. The leading unit 306b is provided at the rear side of the main body 306a. As shown in FIG. 4, the terminal member 311 to which the first to third cables 301a, 301b, 301c, and the fourth and fifth cables 302a and 302b are connected, and the shell 312 formed on the terminal member 311 are mounted in the main body 306a. Further, the leading unit 306b has a plurality of slits 306c and extends from the main body 306a so as to have flexibility. The leading unit 306b protects the first to third cables 301a, 301b, 301c, and the fourth and fifth cables 302a and 302b that are led from the main body 306a so as not to be worn away.

As shown in FIGS. 4 to 7, at one end of the terminal member 311, a terminal 313 that is inserted into the jack 11 of the HD video camera device 10 is provided, and at the other end, a connection unit 314 that connects the first to third cables 301a, 301b, 301c, and the fourth and fifth cables 302a and 302b is provided.

A plug of the terminal 313 has a substantially D shape, and the conductive shell 312 covers around the terminal 313. The terminal 313 protrudes from the front side of the case 306 while being covered by the shell 312, and is inserted into the jack 11 of the HD video camera device 10.

Figures 5A, 5B:
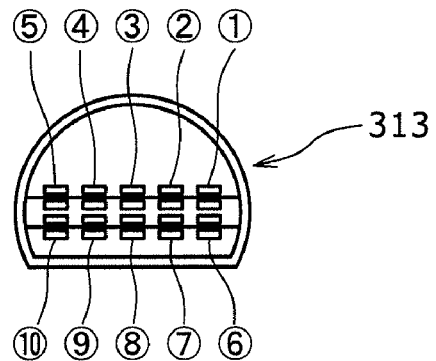
FIGS. 5A and 5B are diagrams showing the pin arrangement of the multiplug of the cable connection device for an HD video signal.
Figure 6:
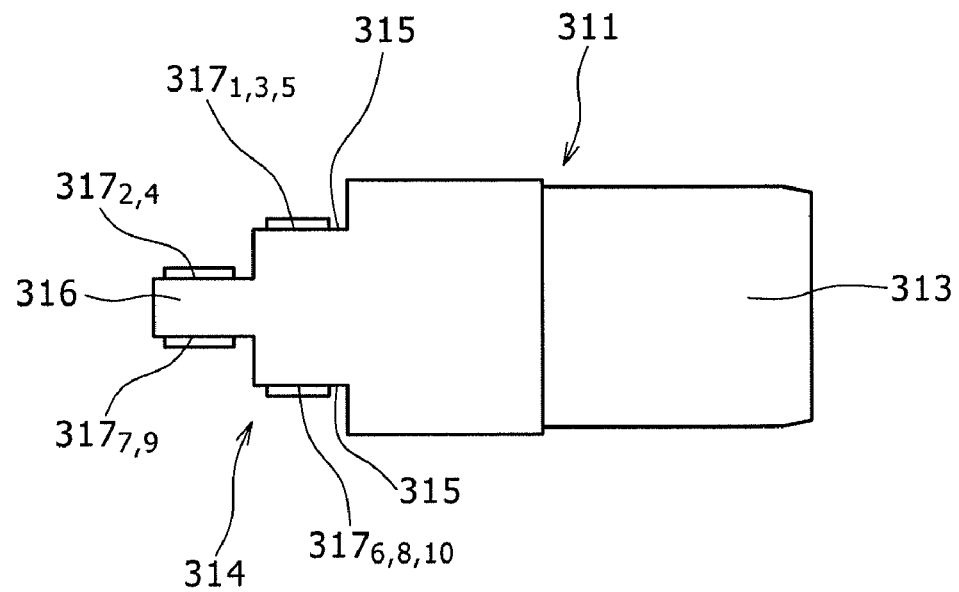
FIG. 6 is a side view of a terminal component.
Figure 7:
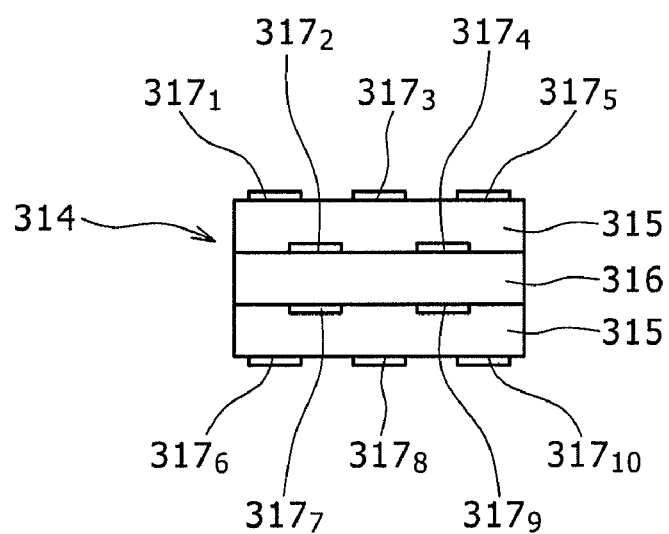
FIG. 7 is a rear side view of the terminal component.

Here, the arrangement of pins of the terminal 313 is shown in FIGS. 5A and 5B. As shown in FIG. 5A, two rows of five pins, that is, a total of 10 pins are arranged in the terminal 313:
First Row
  First pin: L channel audio signal terminal,
  Second pin: signal terminal for local application control bus system LANC that is an interface used for controlling a consumer VCR, but in this embodiment, the second pin is blank,
  Third pin: GND terminal for a video signal,
  Fourth pin: AC power supply terminal of the LANC, but in this embodiment, the fourth pin is blank, and
  Fifth pin: First color signal Pb terminal
Second Row
  Sixth pin: R channel audio signal terminal
  Seventh pin: Plug ID terminal, in here, a resistive element (for example, 33 kΩ) that indicates the cable connection device 30 for the HD video signal is connected, and the other end of the resistive element is connected to a GND line,
  Eighth pin: GND terminal for an audio signal,
  Ninth pin: Second color signal Pr terminal, and
  Tenth pin: Brightness signal Y terminal.

As described above, the terminal 313 is configured such that the terminals for an audio signal (first pin and sixth pin) are provided at one end of the longitudinal direction, and terminals for a video signal (tenth pin, ninth pin, and fifth pin) are provided at the other end of the longitudinal direction and faces the output terminal row. The audio signal terminals and the video signal terminals are disposed apart from each other so that the audio signal and video signal to be transmitted do not interfere with each other.

As shown in FIGS. 4, and 6 to 8, the connection unit 314 that is provided at the opposite side of the above-described terminal 313 has a first step portion 315 provided at a base edge and a second step portion 316 that is provided at an edge before the first step portion 315 and thinner than the first step portion 315. On facing sides of each of the step portions 315 and 316, a connection terminal 317 to which the first to third cables 301a, 301b, and 301c, and the fourth and fifth cables 302a and 302b are connected by soldering is provided.

Specifically, on one of the surfaces of the first step portion 315, connection terminals $317_1$, $317_3$, and $317_5$ that respectively correspond to the first pin, the third pin, and the fifth pin are provided. Further, on one of the surfaces of the second step portion 316, connection terminals $317_2$ and $317_4$ are provided. Furthermore, on the other surface of the first step portion 315, connection terminals $317_6$, $317_8$, and $317_{10}$ that respectively correspond to the sixth pin, the eighth pin, and the tenth pin are provided. On the other surface of the second step portion 316, connection terminals $317_7$ and $317_9$ are provided. In addition, as described below, the first to third cables 301a, 301b, and 301c, and the fourth and fifth cables 302a and 302b are respectively connected to the connection terminals $317_{1\ to\ 10}$.

Connection terminal $317_1$ (corresponds to the first pin) . . . to which the fourth cable 302a (L channel audio signal) of the second cable complex 302 is connected.

Connection terminal $317_2$ (corresponds to the second pin) . . . to which the LANC signal cable may be connected, but in this embodiment, this connection terminal is blank.

Connection terminal $317_3$ (corresponds to the third pin) . . . to which a GND line of the third cable 301c of the first cable complex 301 is connected.

Connection terminal $317_4$ (corresponds to the fourth pin) . . . to which the AC power supply cable of LANC may be connected, but in this embodiment, this connection terminal is blank.

Connection terminal $317_5$ (corresponds to the fifth pin) . . . to which the second cable 301b (first color signal Pb) of the first cable complex 301 is connected.

Connection terminal $317_6$ (corresponds to the sixth pin) . . . to which the fifth cable 302b (R channel audio signal) of the second cable complex 302 is connected.

Connection terminal $317_7$ (corresponds to the seventh pin) . . . to which an end of the resistive element (for example, 33 KΩ) 318 that is a plug ID is connected.

Connection terminal $317_8$ (corresponds to the eighth pin) . . . to which the GND line of the fifth cable 302b of the second cable complex 302 is connected, and the other end of the resistive element 318 is also connected.

Connection terminal $317_9$ (corresponds to the ninth pin) . . . to which the third cable 301c (second color signal Pr) of the first cable complex 301 is connected.

Connection terminal $317_{10}$ (corresponds to the tenth pin) . . . to which the first cable 301a (brightness signal Y) of the first cable complex 301 is connected.

Figure 8:
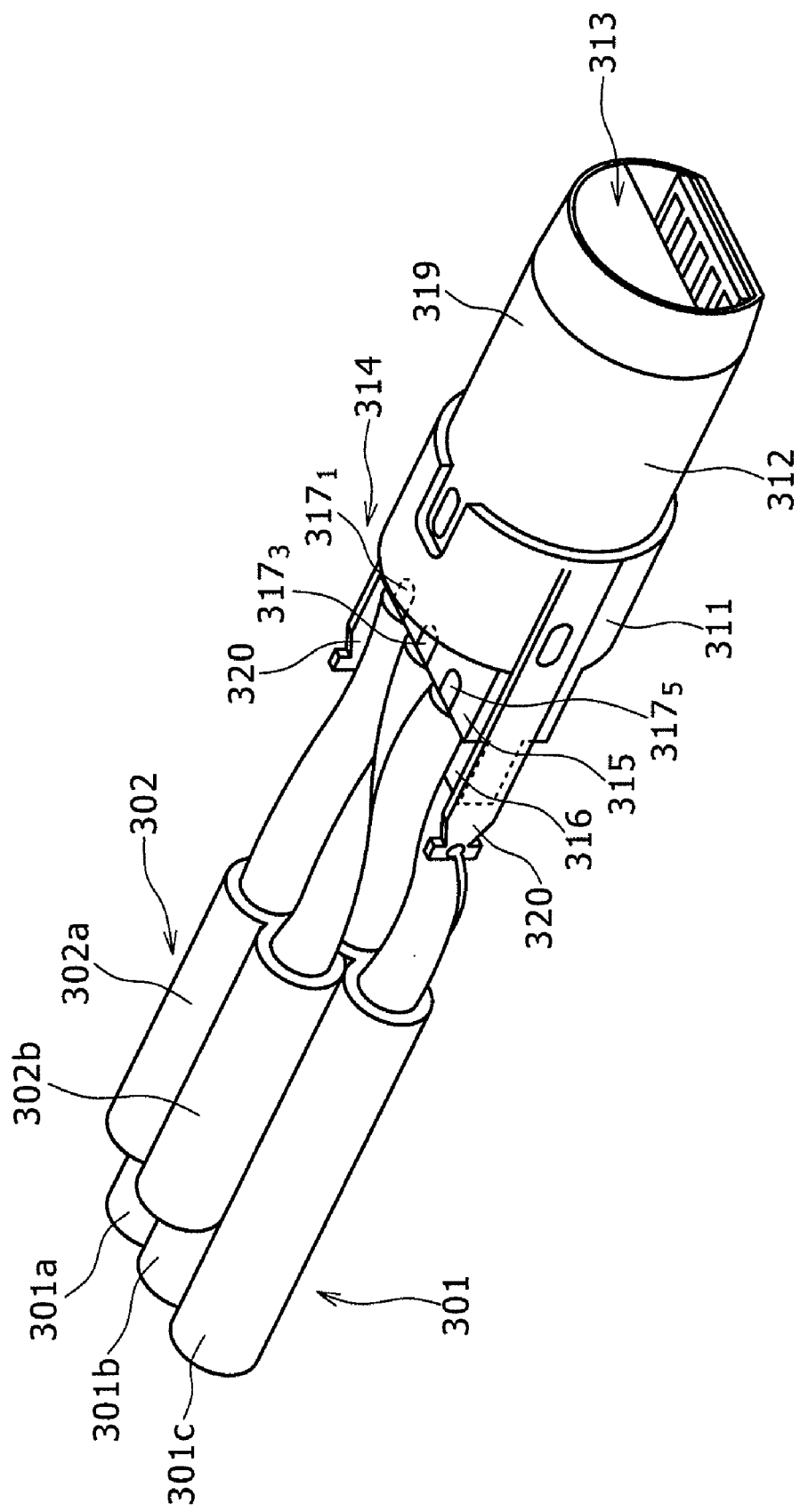
FIG. 8 is a perspective view showing a state when a cable is connected to the terminal component.

As shown in FIGS. 4 and 8, the GND lines of the cables are connected to the shell 312 that covers the terminal 313 of the terminal member 311, by soldering.

The shell 312 is subject to nickel plating thereon and has conductivity. The shell 312 includes a tube 319 in which the terminal 313 of the terminal member 311 is inserted, and arms 320 that are formed at both sides of the tube 319. The GND lines of the cables are connected to the arms 320.

Figure 9:
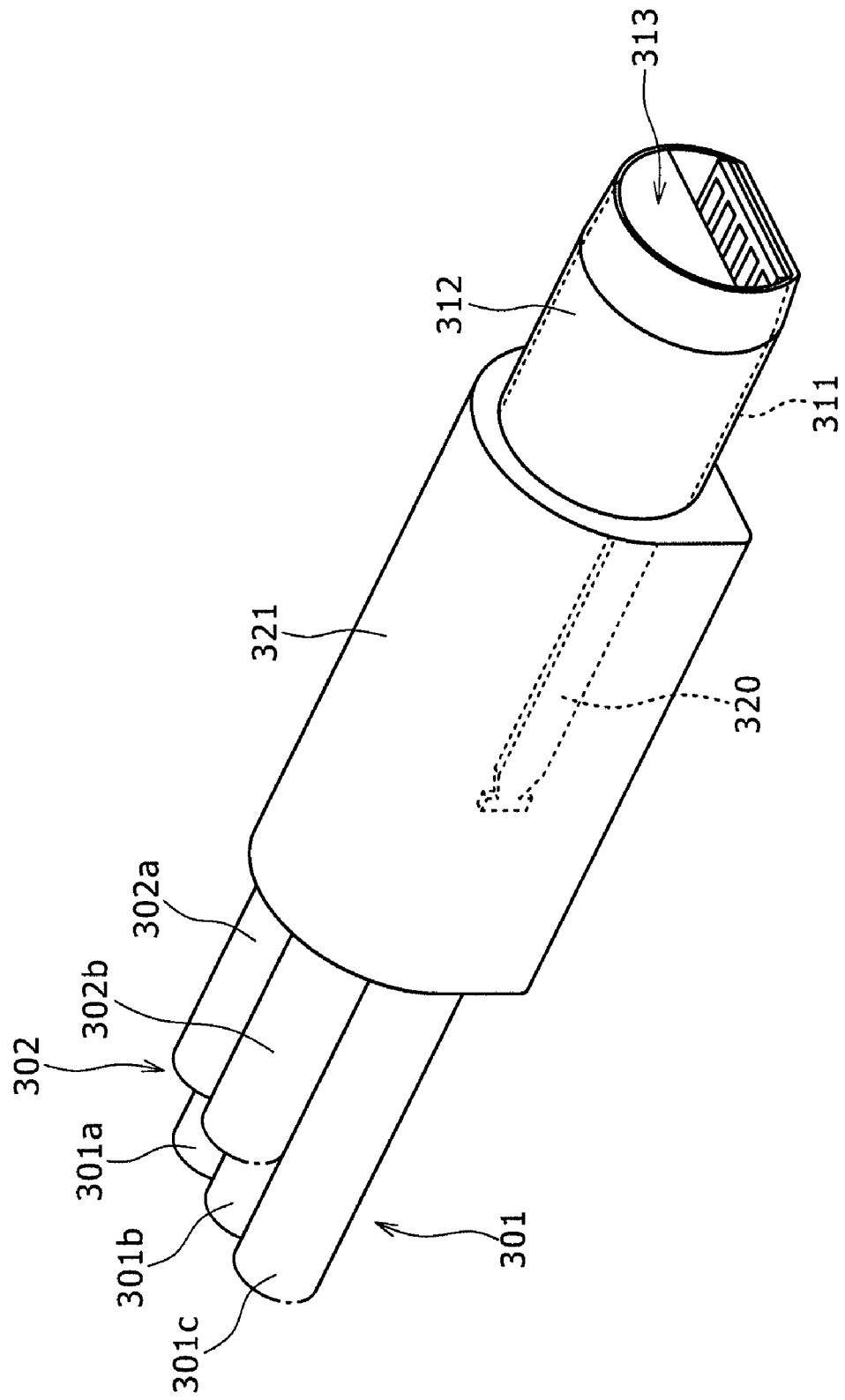
FIG. 9 is a perspective view showing a state when an inner mold is provided in the state shown in FIG. 8.

As described above, when the first to third cables 301a, 301b, and 301c, and the fourth and fifth cables 302a and 302b are connected to the connection terminals $317_{1\ to\ 10}$ provided in the connection unit 314 of the terminal member 311 by soldering, and the GND lines is connected to the shell 312 by soldering, the multiplug 304 becomes a state shown in FIG. 8. Thereafter, as shown in FIG. 9, in order to protect the connection portion between the terminal member 311 or the shell 312 and the first to third cables 301a, 301b, and 301c, and the fourth and fifth cables 302a and 302b, that is, the connection unit 314 of the terminal member 311, an inner mold 321 is provided. The portion where the inner mold 321 is provided substantially corresponds to the main body 306*a* of the case 306 that serves as the external housing of the multiplug 304. The inner mold 321 is molded by a PE (polyethylene) resin. Thereafter, the case 306 is molded on the inner mold 321.

Figure 10:
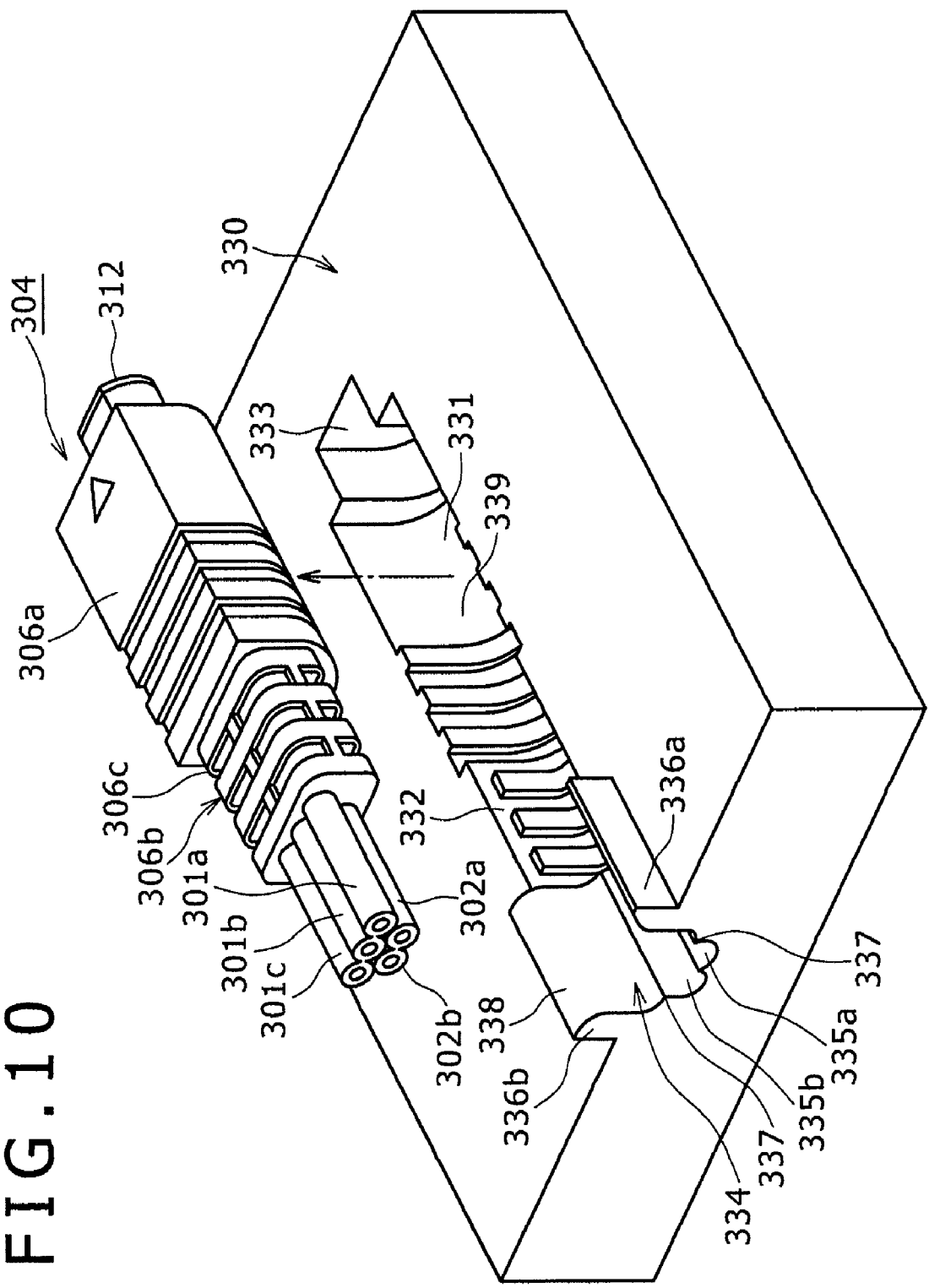
FIG. 10 is a perspective view showing a first mold for molding a case that serves as an external housing of the multiplug.

Here, FIG. 10 shows a first mold 330 when the case 306 is molded. The first mold 330 is a mold for molding the second duplex cable complex 302. The first mold 330 includes a main body molding portion 331 that molds the main body 306*a* of the case 306, a leading unit molding portion 332 that molds the leading unit 306*b* of the case 306, a terminal arrangement portion 333 that is formed continuously with the main body molding portion 331 with the terminal 313 of the terminal member 311 covered by the shell 312, and a cable arrangement portion 334 that is formed continuously with the leading unit molding portion 332 in which the first cable complex 301 and the second cable complex 302, which overlap each other, are arranged.

Figure 11:
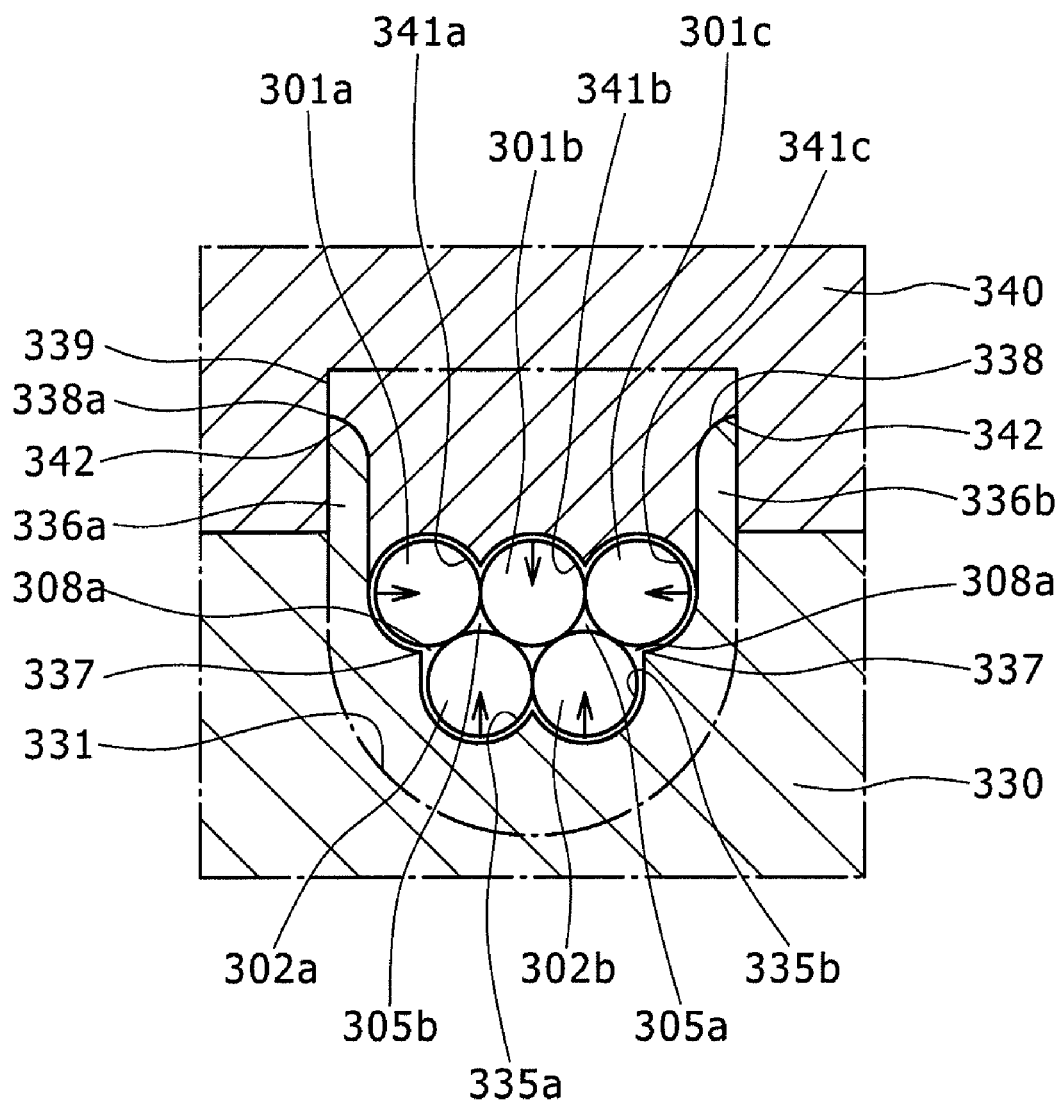
FIG. 11 is a cross-sectional view showing a cable arrangement unit in a state when a first mold is mold-clamped with a second mold.

FIG. 11 is a cross-sectional view showing the cable arrangement unit 334 in a state when the first mold 330 is mold-clamped with a second mold 340 that is locked to the first mold 330.

The cable arrangement unit 334 includes substantially semicircular continuous cable holders 335*a* and 335*b* that hold the second cable complex 302. Further, cable supports 336*a* and 336*b* that hold the both sides of the first cable complex 301 are provided on both sides of the cable holders 335*a* and 335*b* to protrude parallel to each other.

However, when the case 306 is molded, a resin is injected and filled into a cavity 339 that is formed by mold-clamping the first mold 330 and the second mold 340. In this case, the resin that is injected and filled in the cavity 339 may be undesirably exuded along the outer valleys 308 of the first cable complex 301 and the second cable complex 302 that are arranged in the cable arrangement unit 334. Further, the resin may be undesirably exuded in the valleys 305*a* and 305*b* provided between the first cable complex 301 and the second cable complex 302.

Here, as shown in FIGS. 10 and 11, edges 337 of the cable holders 335*a* and 335*b* of the cable arrangement unit 334 that are close to the cable supports 336*a* and 336*b* are formed to project inwardly so as to compress the fourth and fifth cables 302*a* and 302*b* of the second cable complex 302 held by the cable holders 335*a* and 335*b* so as to be close to each other. Further, the cable supports 336*a* and 336*b* that supports the both sides of the first cable complex 301 also project inwardly so as to compress the first to third cables 301*a*, 301*b*, and 301*c* so as to be close to each other. That is, in the first mold 330, the first cable complex 301 and the second cable complex 302 are held in a compressed state in the width direction by the cable holder 335*a* and 335*b* and the cable supports 336*a* and 336*b*. Further, leading end 338 of the cable supports 336*a* and 336*b*, that is, portions that are locked with the second mold 340 are formed in a substantially arc shaped outwardly.

The second mold 340 which is pared with the first mold 330, as shown in FIG. 11, includes substantially semicircular continuous cable holders 341*a*, 341*b*, and 341*c* that hold the first to third cables 301*a*, 301*b*, and 301*c* of the first cable complex 301. A reservoir 342, which receives the arc shaped leading end 338 of the cable supports 336*a* and 336*b* of the first mold 330, is provided in the vicinity of the cable holders 341*a* and 341*c* that are disposed at both sides.

Therefore, as shown in FIG. 11, the mold clamping is performed such that the leading end 338 of the cable supports 336*a* and 336*b* of the first mold 330 is engaged with the reservoir 342 of the second mold 340. By doing so, the first cable complex 301 and the second cable complex 302 are supported to be compressed in the width direction by the cable holders 335*a* and 335*b* and the cable supports 336*a* and 336*b*. Further, as shown by the arrow in FIG. 11, the first cable complex 301 and the second cable complex 302 are compressed so as to be close to each other using the second mold 340. Therefore, in a state when the first mold 330 and the second mold 340 are mold-clamped to each other, the outer valley 308, specifically, a part of outer valleys 308*a* provided between the first cable complex 301 and the second cable complex 302 is reduced. As a result, it is possible to prevent the resin that has been injected and filled into the cavity 339 from being exuded along the outer valley 308 of the first cable complex 301 and the second cable complex 302 arranged in the cable arrangement unit 334. Further, since the first cable complex 301 and the second cable complex 302 are compressed, it is further possible to prevent the resin that has been injected and filled into the cavity 339 from being exuded in the valleys 305*a* and 305*b* formed between the first cable complex 301 and the second cable complex 302.

In the molding device that includes the first mold 330 and the second mold 340, a gate that injects and fills the resin into the cavity 339 is provided in the main body molding unit 331 that is separated from the cable arrangement unit 334. Therefore, when the pressure of the cable arrangement unit 334 is decreased, exuding of the resin can be prevented.

When the first mold 330 and the second mold 340 are opened, and the multiplug 304 that is a molded product is ejected, the first cable complex 301 and the second cable complex 302 compressed by the first and second molds 330 and 340 return to the original state. Therefore, as shown in FIG. 2B, the outer peripheries of the first cable complex 301 and the second cable complex 302 are adhered closely to a closing unit 309 such that the strength is enhanced by the closing unit 309. It is further possible to prevent dust from entering into the multiplug 304.

According to the cable connection device 30 for the HD video signal configured as described above, as shown in FIGS. 2 to 4, the first cable complex 301 and the second cable complex 302 are configured such that the fourth and fifth cables 302*a* and 302*b* of the second cable complex 302 are disposed at the valleys 305*a* and 305*b* of the first cable complex 301 and integrated by the multiplug 304. Therefore, as compared with a fiveplex cable in which 5 cables are arranged in a line, the width of the multiplug 304 can be narrow, for example, the external shape is approximately 10 mm×10 mm (length×width) which allows the reduction in size. Further, the cable connection device 30 for the HD video signal is configured such that the first cable complex 301 for a video signal and the second cable complex 302 for an audio signal are separated from each other in a portion other than the multiplug 304. Therefore, the crosstalk between the video signal and the audio signal can be reduced. For example, with this configuration, it is possible to realize the cable having crosstalk of 80 db or more. Furthermore, it is possible to achieve an attenuation of 0.1 db or less at a characteristic impedance of 75Ω and 30 MHz.

Further, as shown in FIG. 11, in the cable connection device 30, the first triplex cable complex 301 and the second duplex cable complex 302 overlap. Therefore, when the case 306 that serves as an external housing of the multiplug 304 is molded, the resin can be injected and filled while the first cable complex 301 and the second cable complex 302 are compressed so as to be close to each other. As a result, the resin is prevented from being exuded, which improves the visual quality. Furthermore, the removing process of burr can be omitted, which improves the production efficiency.

As shown in FIG. 2B, the outer peripheries of the first cable complex 301 and the second cable complex 302 are adhered closely to the closing unit 309, and the strength is enhanced by the closing unit 309. Further, it is possible to prevent dust from entering into the multiplug 304.

The cable connection device 30 for the HD video signal according to the above embodiment is configured such that the first triplex cable complex 301 and the second duplex cable complex 302 are laminated and then integrated by the multiplug 304. However, as long as the odd numbered parallel cables and the even numbered parallel cables are laminated, the same effect as the cable connection device 30 can be achieved. For example, the cable connection device 60 that is used to transmit the SD video signal is a triplex cable configured by two cables that transmit an audio signal and one cable that transmits a video signal, which will be described below. More specifically, the duplex cable for transmitting the audio signal and a cable for transmitting the video signal may be disposed at the valleys of the duplex cable.

Further, even though the above cable connection device 30 for the HD video signal uses a resistive element for a plug ID, another identification device such as an RFID tag may be provided therefor.

However, the cable connection device 30 for the HD video signal is not limited to connect the HD video camera device 10 and the HD monitor device 20, but may be used to connect a VTR and the HD monitor device 20. Further, the cable connection device 30 for the HD video signal may transmit a component video signal that includes the brightness signal Y, the first color signal Cb, and the second color signal Cr.

Furthermore, the cable connection device 30 for the HD video signal may be provided with a substantially cylindrical ferrite core, which passes through the center of the cable, in the vicinity of the multiplug 304, the Y plug 303a, the Pb plug 303b, the Pr plug 303c, the L channel audio plug 303d, or the R channel audio plug 303e in order to prevent radiation noise or static electricity generated from the cable.

(2) Description of Cable Connection Device 60 for SD Video Signal

As shown in FIG. 1, the cable connection device 60 that connects the HD video camera device 10 or the SD video camera device 40 with the SD monitor device 50 is configured to have a triplex cable in which a first cable 601 for an SD video signal, and second and third cables 602 and 603 for an audio signal are integrally formed in a line. Therefore, the cable connection device 60 is provided with a multiplug 600, which has the same configuration as the multiplug 304 used in the cable connection device 30 for the HD video signal. The multiplug 600 is provided at a side of the cable connection device 60, which is connected to the HD video camera device 10 or the SD video camera 40. Further, at the other side of the cable connection device 60 for the SD video signal, which is connected to the SD monitor device 50, an SD video signal plug 604 is provided for the first cable 601, an L channel audio plug 605 is provided at the second cable 602, and an R channel audio plug 606 is provided for the third cable 603. The SD video signal plug 604 is an RCA plug that outputs a component signal VIDEO, or configured as an S terminal. When three video cables are used, in addition to the plug for a component signal VIDEO, a plug for a brightness signal S-Y and a plug for a color signal S-C may be provided. Further, even though standard cables are used for the first to third cables 601, 602, and 603, broadband cable, which is used for the cable connection device 30 for the HD video signal, may be used therefor.

The multiplug 600 that is connected with the HD video camera device 10 or the SD video camera device 40 is connected to the jack 11 or 41 provided in the HD video camera device 10 or the SD video camera device 40.

Figures 12A, 12B:
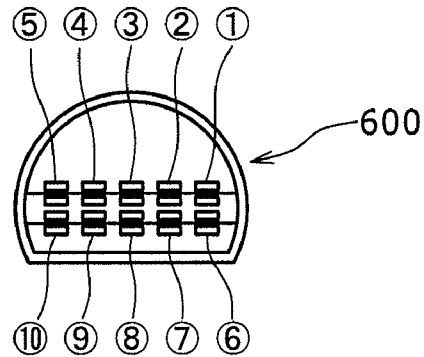
FIGS. 12A and 12B are diagrams showing the pin arrangement of a multiplug of a cable connection device for an SD video signal.

Here, the arrangement of pins of the multiplug 600 will be described with reference to FIGS. 12A and 12B:

First Row
 First pin: L channel audio signal terminal,
 Second pin: Signal terminal of the LANC, but in this embodiment, the second pin is blank,
 Third pin: GND terminal for a video signal,
 Fourth pin: AC power supply terminal of the LANC, but in this embodiment, the fourth pin is blank, and
 Fifth pin: Color signal S-C terminal Second Row
 Sixth pin: R channel audio signal terminal
 Seventh pin: Short. A resistive element 318 is not connected,
 Eight pin: GND terminal for an audio signal,
 Ninth pin: Composite signal VIDEO terminal, and
 Tenth pin: Brightness signal S-Y terminal.

The cable connection device 60 for the SD video signal with the above configuration may connect the multiplug 600 to the jack 11 of the HD video camera device 10 or the jack 41 of the SD video camera device 40. Therefore, the cable connection device 60 for the SD video signal displays an SD video signal on the SD monitor device 50.

The cable connection device 60 for the SD video signal is not limited to connect the SD video camera device 40 and the SD monitor device 50, but may be used to connect the VTR and the SD monitor device 50. Further, similar to the cable connection deice 30 for the HD video signal, the cable connection device 60 for the SD video signal may be provided with a substantially cylindrical ferrite core, which passes through the center of the cable, in order to prevent radiation noise or static electricity generated from the cable.

(3) Description of HD Video Camera Device 10

As described above, the HD video camera device 10 can selectively output the HD video signal and the SD video signal from the jack 11. Further, the multiplug 304 of the cable connection device 30 for the HD video signal or the multiplug 600 of the cable connection device 60 for the SD video signal is selectively inserted and connected to the jack 11.

The multiplug 304 of the cable connection device 30 for the HD video signal and the multiplug 600 of the cable connection device 60 for the SD video signal are physically identical with each other, and have ten pins. The jack 11 to which the multiplugs 304 and 600 are inserted, outputs signals, as shown in FIG. 13.

Here, the kinds of signals when the first to fourth, sixth, and eighth pins output the HD video signal are not different the kinds of signals when the first to fourth, sixth, and eighth pins output the SD video signals.

The seventh pin represents the plug ID, and has a predetermined resistance. For example, when using the cable connection device 30 for the HD video signal, the resistance of the seventh pin has is 33 kΩ. However, in the case of the cable connection device 60 for the SD video signal, since the resistive element is not connected to the seventh pin, the resistance is 0Ω.

In the case of the HD video signal, the fifth pin outputs the first color signal Pb, and in the case of the SD video signal, outputs the color signal S-C.

In the case of the HD video signal, the ninth pin outputs the second color signal Pr, and in the case of the SD video signal, outputs the composite signal VIDEO.

In the case of the HD video signal, the tenth pin outputs the brightness signal Y, and in the case of the SD video signal, also outputs the brightness signal S-Y.

Figure 14:
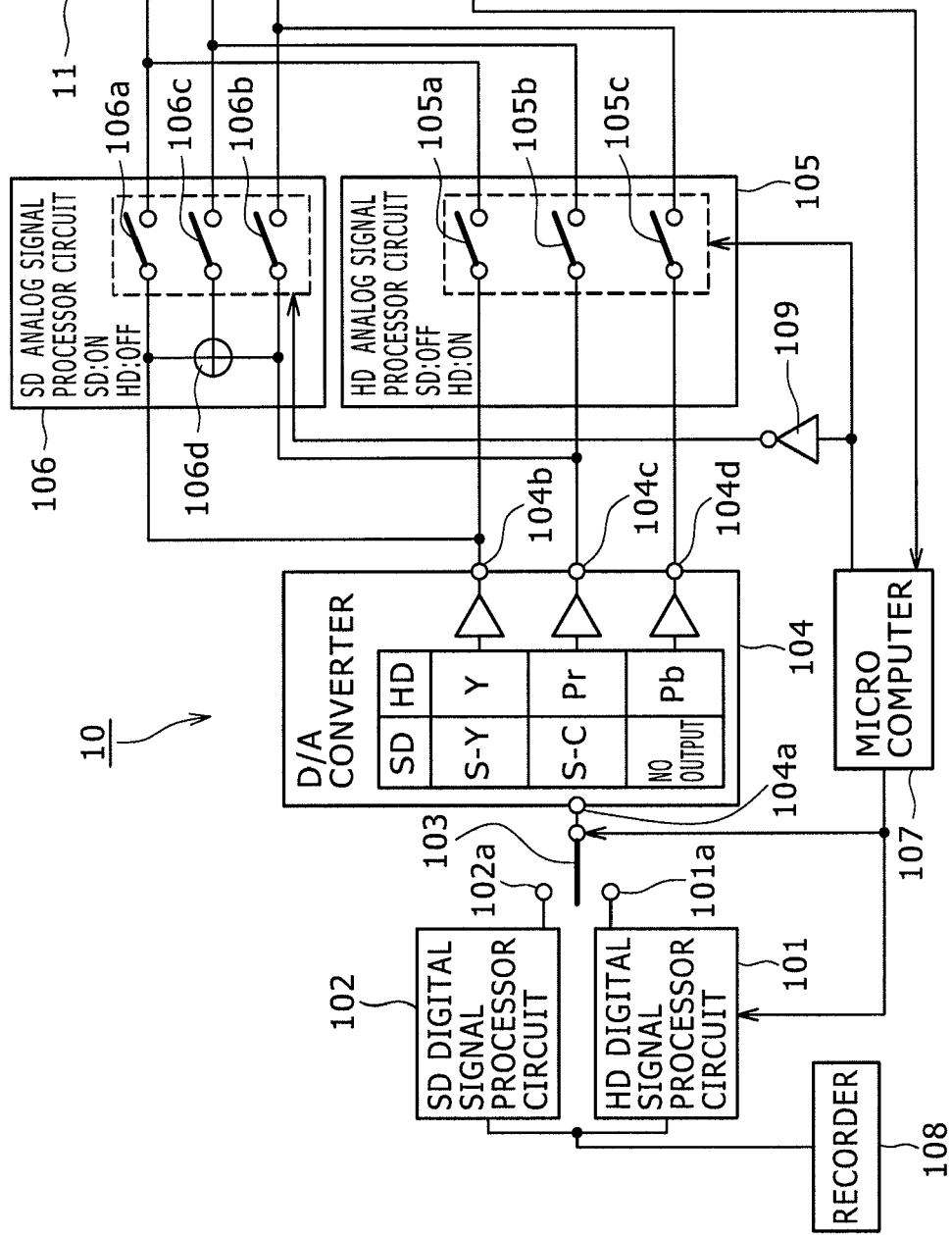
FIG. 14 is a block diagram showing the HD video camera device.

As shown in FIG. 14, the HD video camera device 10 includes an HD digital signal processor circuit 101 that generates a digital HD video signal, an SD digital signal processor circuit 102 that generates a digital SD video signal, a first switch 103 that switches the HD digital signal processor circuit 101 and the SD digital signal processor circuit 102, a D/A converter 104 that converts the digital HD video signal or the digital SD video signal into an analog signal, an HD analog signal processor circuit 105 that is switched so as to output the analog HD video signal, an SD analog signal processor circuit 106 that is switched so as to output the analog SD video signal, a micro computer 107 that discriminates the kind of cable connection device connected to the jack 11, a recorder 108 that records and stores an image captured by a capturing unit as the HD video signal or the SD video signal, and an inverter 109 that switches the outputs from the HD analog signal processor circuit 105 and the SD analog signal processor circuit 106.

The HD digital signal processor circuit 101 generates an HD component video signal configured to have the brightness signal Y, the first color signal Pb, and the second color signal Pr from a signal captured by a capturing device, such as a charge-coupled device (CCD) or a complementary metal-oxide semiconductor (CMOS), and stores the signal as a digital signal in the recorder 108. Further, when a signal is output to the HD monitor device 20, the HD digital signal processor circuit 101 reads out the digital HD video signal, that is, composite video signal from the recorder 108.

Further, the SD digital signal processor circuit 102 generates the brightness signal S-Y from a signal captured by the capturing device, such as CCD or CMOS and generates a color signal S-C from a color difference signals R-Y and B-Y. Thereafter, the SD digital signal processor circuit 102 stores the composite signal VIDEO, which composes the brightness signal S-Y and the color signal S-C in the recorder 108 as a digital signal. When a signal is output to the SD monitor device 50, the SD digital signal processor circuit 102 reads out the digital SD video signal, that is, the composite signal VIDEO from the recorder 108, and generates the brightness signal S-Y and the color signal S-C from the composite signal VIDEO.

When the cable connection device 30 for the HD video signal is connected, the first switch 103 selects the HD digital signal processor circuit 101 to output the HD video signal, that is, the brightness signal Y, the first color signal Pb, the second color signal Pr to the D/A converter 104. Further, when the cable connection device 60 for the SD video signal is connected, the first switch 103 selects the SD digital signal processor circuit 102 to output the brightness signal S-Y and the color signal S-C generated from the SD video signal, that is, the composite signal VIDEO to the D/A converter 104.

The D/A converter 104 includes an input port 104a to which the HD video signal from the HD digital signal processor circuit 101 or the SD video signal from the SD digital signal processor circuit 102 is selectively input, and first to third output ports 104b, 104c, and 104d.

When the digital HD video signal is input from the HD digital signal processor circuit 101, the D/A converter 104 converts the digital brightness signal Y into an analog signal to output through the first output port 104b. Further, the D/A converter 104 converts the digital second color signal Pr into an analog signal to output through the second output port 104c, and converts the digital first color signal Pb into an analog signal to output through the third output signal 104d.

Further, when the digital SD video signal is input from the SD digital signal processor circuit 102, the D/A converter 104 converts the digital brightness signal S-Y into an analog signal to output through the first output port 104b, and converts the digital color signal S-C into an analog signal to output through the second output port 104c. In this case, no signal is output through the third output port 104d.

The HD analog signal processor circuit 105 controls the output of the analog HD video signal. Specifically, the HD analog signal processor circuit 105 includes first to third switches 105a, 105b, and 105c that serve as second switching units. The first switch 105a is provided between the first output port 104b of the D/A converter 104 and the tenth pin of the jack 11 to control the output of the analog brightness signal Y of the HD video signal. The second switch 105b is provided between the second output port 104c of the D/A converter 104 and the ninth pin of the jack 11 to control the output of the analog second color signal Pr of the HD video signal. The third switch 105c is provided between the third output port 104d of the D/A converter 104 and the fifth pin of the jack 11 to control the output of the analog first color signal Pb of the HD video signal.

The SD analog signal processor circuit 106 controls the output of the analog SD video signal. Specifically, SD analog signal processor circuit 106 includes fourth to sixth switches 106a, 106b, and 106c that serve as second switching units. The fourth switch 106a is provided between the first output port 104b of the D/A converter 104 and the tenth pin of the jack 11 to control the output of the analog brightness signal S-Y of the SD video signal. The fifth switch 106b is provided between the second output port 104c of the D/A converter 104 and the fifth pin of the jack 11 to control the output of the analog color signal S-C of the SD video signal.

The SD analog signal processor circuit 106 further includes an adder 106d that adds the outputs of the first output port 104b and the second output port 104c of D/A converter 104. The adder 106d adds the analog brightness signal S-Y and color signal S-C of the SD video signal to generate the composite signal VIDEO. The sixth switch 106c is provided between the adder 106d and the ninth pin to control the output of the analog composite signal VIDEO of the SD video signal.

The micro computer 107 detects a resistance of the seventh pin. Therefore, when the resistance is a predetermined value, that is, 33 kΩ, the micro computer 107 determines that the cable connection device 30 for the HD video signal is connected to the jack 11. Further, when the resistance is 0Ω, the micro computer 107 determines that the cable connection device 60 for the SD video signal is connected to the jack 11. When the resistance is ∞ Ω, the micro computer 107 determines that no cable connection device is connected to the jack 11. Specifically, when the micro computer 107 determines that the cable connection device 30 for the HD video signal is connected to the jack 11, the micro computer 107 connects the first switch 103 to a terminal 101a and switches the first switch 103 so as to connect the HD digital signal processor circuit 101 and the D/A converter 104. Further, when the micro computer 107 determines that the cable connection device 60 for the SD video signal is connected to the jack 11, the micro computer 107 connects the first switch 103 to a terminal 102a, and switches the first switch 103 so as to connect the SD digital signal processor circuit 102 to the D/A converter 104. Further, the micro computer 107 outputs a control signal, which controls the first to third switches 105a, 105b, and 105c and the fourth to sixth switches 106a, 106b, and 106c to be switched, to the inverter 109.

The inverter 109 controls the first to third switches 105a, 105b, and 105c and the fourth to sixth switches 106a, 106b, and 106c on the basis of the control signal input from the micro computer 107 to be switched. Specifically, when the analog HD video signal is output, the inverter 109 turns on the first to third switches 105a, 105b, and 105c and turns off the fourth to sixth switches 106a, 106b, and 106c. Therefore, the analog brightness signal Y of an HD video signal is output from the tenth pin of the jack 11, the analog second color signal Pr of an HD video signal is output from the ninth pin of the jack 11, and the analog first color signal Pb of an HD video signal is output from the fifth pin of the jack 11.

Further, when the analog SD video signal is output, the inverter 109 turns off the first to third switches 105a, 105b, and 105c and turns on the fourth to sixth switches 106a, 106b, and 106c. Therefore, the analog brightness signal S-Y of an SD video signal is output from the tenth pin of the jack 11, the analog composite signal VIDEO of an SD video signal is output from the ninth pin of the jack 11, and the analog color signal S-C of an SD video signal is output from the fifth pin of the jack 11.

Figure 15:
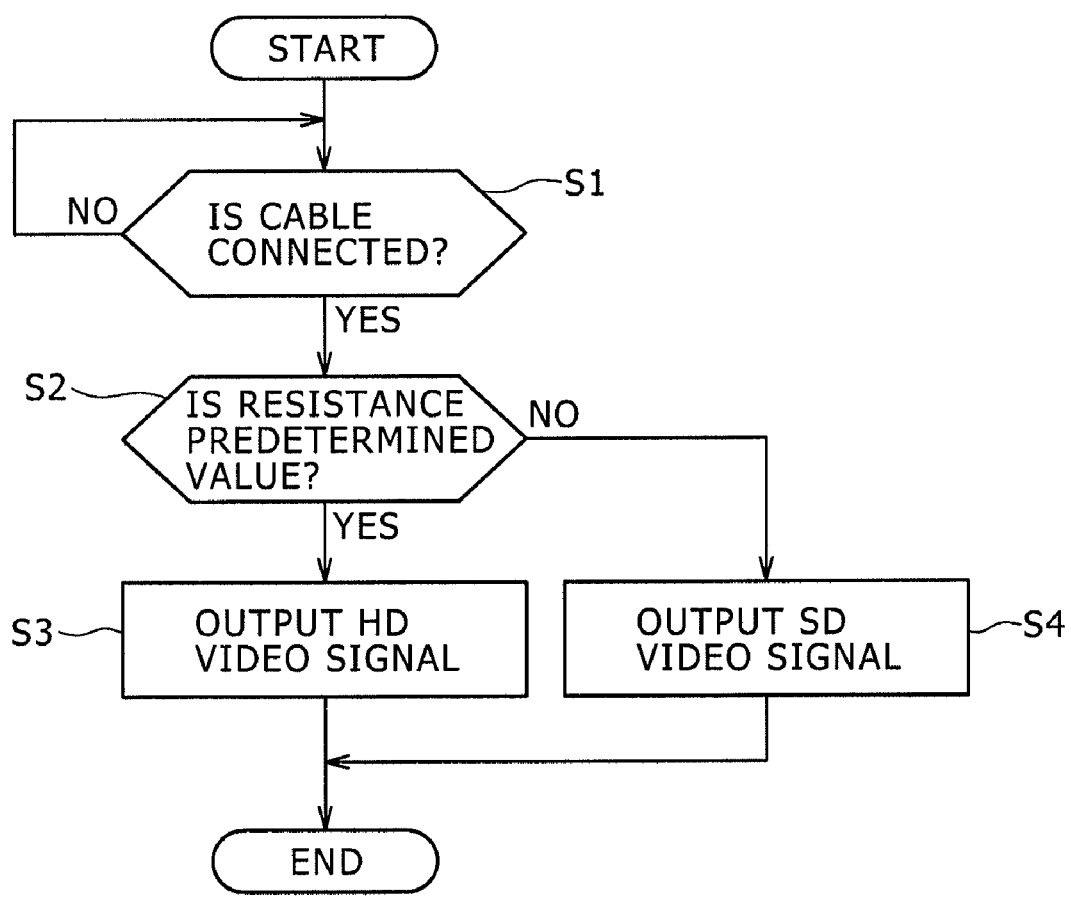
FIG. 15 is a flow chart showing processes from detecting the kind of cable connection device connected to the jack of the HD video camera device to outputting the HD video signal and SD video signal.

Next, processes from detecting the kind of cable connection device connected to the jack 11 of the HD video camera device 10 to outputting the HD video signal or the SD video signal will be described with reference to FIG. 15.

In step S1, the micro computer 107 detects the resistance of the seventh pin to determine whether the resistance is a value from $\infty\Omega$ to $0\Omega$ or 33 k$\Omega$. When the resistance is $0\Omega$ or 33 k$\Omega$, the micro computer 107 determines whether any of the multiplug 304 of the cable connection device 30 for the HD video signal and the multiplug 600 of the cable connection device 60 for the SD video signal is connected to the jack 11. When the cable is connected to the jack 11, the micro computer 107 determines whether the resistance is a predetermined value, for example, 33 k$\Omega$ in step S2. When the resistance is a predetermined value, the micro computer 107 determines that the cable connection device 30 for the HD video signal is connected and proceeds to step S3. In contrast, when the resistance is not a predetermined value, the micro computer 107 determines that the cable connection device 60 for the SD video signal is connected and proceeds to step S4.

When the cable connection device 30 for the HD video signal is connected, the micro computer 107 connects the first switch 103 to the terminal 101a so as to output the HD video signal to the D/A converter 104 in step S3. Further, the micro computer 107 controls the inverter 109 so as to turn on the first to third switches 105a, 105b, and 105c, and turn off the fourth to sixth switches 106a, 106b, and 106c.

By doing so, the HD digital signal processor circuit 101 outputs the component video signal configured by the brightness signal Y, the first color signal Pb, and the second color signal Pr to the D/A converter 104. The D/A converter 104 converts the digital signal into an analog signal to output an analog brightness signal Y through the first output port 104b. The analog brightness signal Y is output to the tenth pin through the first switch 105a. The D/A converter 104 outputs an analog second color signal Pr through the second output port 104c. The analog second color signal Pr is output to the ninth pin through the second switch 105b. The D/A converter 104 outputs an analog first color signal Pb through the third output port 104d. The analog first color signal Pb is output to the fifth pin through the third switch 105c. Further, from the first and sixth pins, an audio signal is output.

As shown in FIG. 1, the cable connection device 30 for the HD video signal is configured such that the Y plug 303a is connected to a Y input terminal 21a of the HD monitor device 20, the Pb plug 303b is connected to a Pb input terminal 21b, and the Pr plug 303c is connected to a Pr input terminal 21c. Further, the L channel audio plug 303d is connected to an L channel audio input terminal 21d, and the R channel audio plug 303e is connected to an R channel audio input terminal 21e. Therefore, in the HD monitor device 20, the HD video signal is displayed and a stereo audio signal is output.

When the cable connection device 60 for the SD video signal is connected, the micro computer 107 connects the first switch 103 to the terminal 102a so as to output the SD video signal to the D/A converter 104 in step S4. Further, micro computer 107 controls the inverter 109 so as to turn off the first to third switches 105a, 105b, and 105c, and turn on the fourth to sixth switches 106a, 106b, and 106c.

By doing so, the SD digital signal processor circuit 102 outputs the brightness signal S-Y and the color signal S-C to the D/A converter 104. The D/A converter 104 converts the digital signal into an analog signal to output an analog brightness signal S-Y through the first output port 104b. The analog brightness signal S-Y is output to the tenth pin through the fourth switch 106a. The D/A converter 104 outputs an analog color signal S-C through the second output port 104c. The analog color signal S-C is output to the fifth pin through the fifth switch 106b. Further, the adder 106d adds the analog brightness signal S-Y and color signal S-C to generate a composite signal VIDEO to output to the ninth pin. Further, from the first and sixth pins, an audio signal is output.

As shown in FIG. 1, the cable connection device 60 for the SD video signal is configured such that the SD video signal plug 604 is connected to the composite input terminal or an S terminal 61a of an RCS of the SD monitor device 50. Further, the L channel audio plug 605 is connected to an L channel audio input terminal 61b, and the R channel audio plug 606 is connected to an R channel audio input terminal 61c. Therefore, in the SD monitor device 50, the SD video signal is displayed and a stereo audio signal is output.

When the above configuration is adopted, while the HD video camera device 10 can output both the HD video signal and the SD video signal, both the multiplug 304 of the cable connection device 30 for the HD video signal and the multiplug 600 of the cable connection device 60 for the SD video signal are connected to one jack 11. Therefore, it is possible to reduce the number of jacks and the number of components as compared with the related art. It is further possible to reduce the size of the entire device. In the HD video camera deice 10, both the multiplug 304 of the cable connection device 30 for the HD video signal and the multiplug 600 of the cable connection device 60 for the SD video signal are connected to one jack 11. However, in this case, the kind of cable is discriminated, the HD video signal and the SD video signal is selectively output on the basis of the discrimination result. Therefore, it is possible to prevent an incorrect video signal from being output to the HD monitor device 20 or the SD monitor device 50.

In the HD video camera device 10, the micro computer 107 may discriminate the kind of various cables. For example, in the above embodiment, the resistance of the cable connection device 30 for the HD video signal is defined as 33 k$\Omega$, and the resistance of the cable connection device 60 for the SD video signal is defined as $0\Omega$. However, different resistance may be allocated to a cable that is connected to a headphone or an earphone, to be discriminated by the micro computer 107. In this case, only the L channel audio signal and the R channel audio signal are output. Further, different resistance may be allocated to a cable that is connected to a manual operating device, such as, a remote control device, to be discriminated by the micro computer 107. In this case, in the above embodiment, the control signal may be received or transmitted by using the second pin and fourth pin that is used for the LANC, but in this embodiment, the second and the fourth pin are blank. Accordingly, the micro computer 107 can discriminate the kind of various cables.

(4) Description of SD Video Camera Device 40

The SD video camera device 40 includes a jack 41 that outputs an SD video signal. The jack 41 exclusively outputs an SD video signal, and is connected with the cable connection device 60 for the SD video signal. In this case, when it is considered that the multiplug 304 of the cable connection device 30 for the HD video signal and the multiplug 600 of the cable connection device 60 for the SD video signal have physically identical shapes, the jack 41 is physically identical with the jack 11 of the HD video camera device 10.

Figure 16:
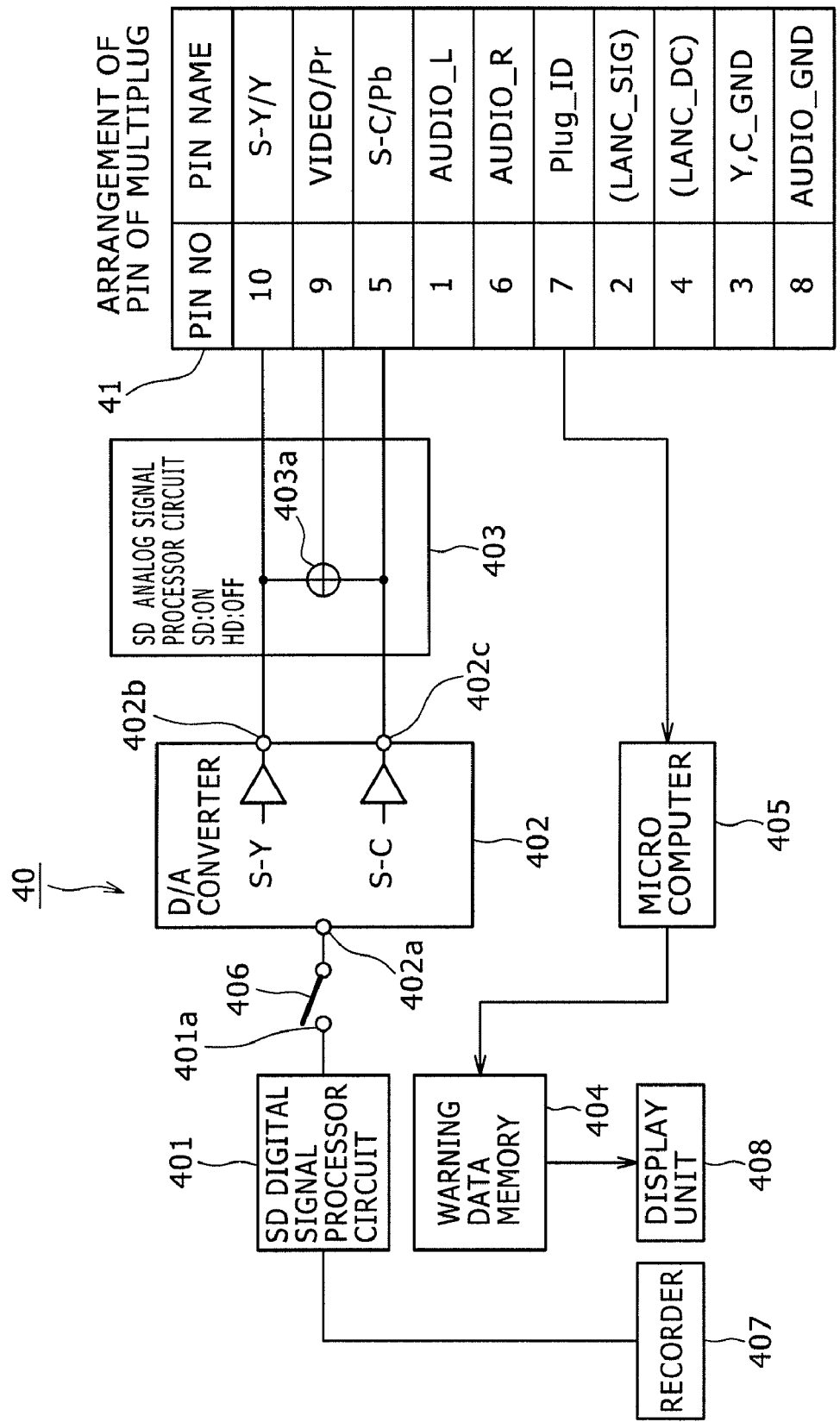
FIG. 16 is a block diagram showing the SD video camera device.

As shown in FIG. 16, the SD video camera device 40 includes an SD digital signal processor circuit 401 that generates a digital SD video signal, a D/A converter 402 that converts the digital SD video signal into an analog signal, an SD analog signal processor circuit 403 that generates the analog SD video signal, a warning data memory 404 that stores warning data that is displayed when an incorrect cable connection device is connected to the jack 41, a micro computer 405 that discriminates the kind of cable connection device connected to the jack 41, and a switch 406 that switches the output of the SD digital signal processor circuit 401.

The SD digital signal processor circuit 102 generates a the brightness signal S-Y from a signal captured by a capturing device, such as a CCD or a CMOS sensor and a color signal S-C from a color difference R-Y and B-Y, composes the brightness signal S-Y and the color signal S-C to store a composite signal VIDEO as a digital signal in a recorder 407. Further, when a signal is output to the SD monitor device 50, the SD digital signal processor circuit 102 reads out the digital SD video signal, that is, the composite video signal VIDEO from the recorder 407 and separates the brightness signal S-Y and the color signal S-C from the composite signal VIDEO.

When the cable connection device 60 for the SD video signal is connected to the switch 406, the switch 406 is turned on to output the SD video signal, that is, the brightness signal S-Y and the color signal S-C to the D/A converter 402. Further, when an incorrect cable, that is, the cable connection device 30 for the HD video signal is connected, the switch 406 is turned off to prohibit the output of the SD video signal.

The D/A converter 402 includes an input port 402a to which the SD video signal from the SD digital signal processor circuit 102 is input, and first and second output ports 402b and 402c. When the digital SD video signal is input from the SD digital signal processor circuit 401, the D/A converter 402 converts the digital brightness signal S-Y into an analog signal to output through the first output port 402b, and converts the digital color signal S-C into an analog signal to output through the second output port 402c.

The SD analog signal processor circuit 403 generates the analog SD video signal to be output. Specifically, the SD analog signal processor circuit 403 includes an adder 403a that adds the outputs of the first output port 402b and the second output port 402c of the D/A converter 402. The adder 403a adds the analog brightness signal S-Y and color signal S-C of the SD video signal to generate the composite signal VIDEO.

Therefore, the analog brightness signal S-Y output from the first output port 402b of the D/A converter 402 is input to the tenth pin of the jack 41, the analog color signal S-C output from the second output port 402c of the D/A converter 402 is input to the fifth pin of the jack 41, and the composite signal VIDEO generated by the adder 403a is input to the ninth pin of the jack 41.

The warning data memory 404 stores data that displays a warning notice on a display unit 408 such as a monitor or a view finder of the SD video camera device 40 when an incorrect cable is connected to the jack 41, instead of the cable connection device 60 for the SD video signal. For example, when the cable connection device 30 for the HD video signal is connected to the jack 41 of the SD video camera device 40, the HD monitor device 20 is very likely to be connected thereto. That is, as shown in FIG. 1, the HD monitor device 20 is provided with an input terminal for a component signal, that is, the Y input terminal 21a, the Pb input terminal 21b, and the Pr input terminal 21c. Therefore, the HD monitor device 20 is connected to the SD video camera device 40 and thus the SD video signal is input to the HD monitor device 20. More specifically, the Y plug 303a of the cable connection device 30 for the HD video signal is connected to the Y input terminal 21a, and the Pb plug 303b is connected to the Pb input terminal 21b. Further, the Pr plug 303c is connected to the Pr input terminal 21c. Therefore, the SD video signal is input to the HD monitor device 20, and thus display is not correctly performed. Therefore, the warning data memory 404 stores warning data such as text data such as letters, image data, moving image data, and voice data. For example, the warning data memory 404 may store warning data such as "this cable is not compatible with this monitor".

The micro computer 405 detects the resistance of the seventh pin. When the resistance is a predetermined value, for example, 33 kΩ, the micro computer 405 determines that the cable connection device 30 for the HD video signal is incorrectly connected to the jack 41. When the resistance is 0Ω, the micro computer 405 determines that the cable connection device 60 for the SD video signal is connected to the jack 41. Further, when the resistance is ∞Ω, no cable connection device is connected to the jack 41. Specifically, the micro computer 405 determines that the cable connection device 30 for the HD video signal is incorrectly connected to the jack 41, the micro computer 405 turns off the switch 406. In addition, when the micro computer 405 determines that the cable connection device 60 for the SD video signal is correctly connected to the jack 41, the micro computer 405 turns on the switch 406 to be connected with a terminal 401a and switches the switch 406 so as to connect the SD digital signal processor circuit 401 and the D/A converter 402.

Next, processes from detecting the kind of cable connection device connected to the jack 41 of the SD video camera device 40 to outputting the SD video signal will be described with reference to FIG. 17.

In step S11, the micro computer 405 detects the resistance of the seventh pin to determine whether the resistance is a value from ∞Ω to 0Ω or 33 kΩ. When the resistance is 0Ω or 33 kΩ, the micro computer 405 determines whether any of the multiplug 304 of the cable connection device 30 for the HD video signal and the multiplug 600 of the cable connection device 60 for the SD video signal is connected to the jack 41. When the cable is connected to the jack 41, the micro computer 405 determines whether the resistance is a predetermined value, for example, 33 kΩ in step S12. When the resistance is a predetermined value, the micro computer 405 determines that the cable connection device 30 for the HD video signal is incorrectly connected and proceeds to step S13. In contrast, when the resistance is not a predetermined value, the micro computer 405 determines that the cable connection device 60 for the SD video signal is correctly connected and then proceeds to step S14.

When the cable connection device 30 for the HD video signal is incorrectly connected to the jack 41, in step S13, the micro computer 405 separates the switch 406 from the terminal 401a and turns off the switch 406. Further, the micro computer 405 prohibits the output of the SD video signal and prevents the SD video signal from being output to the HD monitor device 20. Further, the micro computer 405 reads out the warning data from the warning data memory 404 to display the warning data on the display unit 408 such as a monitor or a viewfinder.

When the micro computer 405 determines that the cable connection device 60 for the SD video signal is correctly connected, in step S14, the micro computer 405 turns on the switch 406 to connect the terminal 401a and the D/A converter 402. By doing so, the SD digital signal processor circuit 401 outputs the brightness signal S-Y and the color signal S-C to the D/A converter 402. The D/A converter 402 converts the digital signal into an analog signal to output the analog brightness signal S-Y through the first output port 402b. The analog brightness signal S-Y is output to the tenth pin. Further, D/A converter 402 outputs the analog color signal S-C from the second output port 402c. The analog color signal S-C is output to the fifth pin. Furthermore, the adder 403a adds the analog brightness signal S-Y and the color signal S-C to generate a composite signal VIDEO and output to the ninth pin. From the first and sixth pins, audio signals are output.

As shown in FIG. 1, the cable connection device 60 for the SD video signal is configured such that the SD video signal plug 604 is connected to the composite input terminal or the S terminal 61a of the RCA of the SD monitor device 50. Further, the L channel audio plug 605 is connected to the L channel audio input terminal 61b, and the R channel audio plug 606 is connected to the R channel audio input terminal 61c. Therefore, in the SD monitor device 50, the SD video signal is displayed and a stereo audio signal is output.

In the SD video camera device 40 configured as described above, the micro computer 405 determines whether the cable connection deice 60 for the SD video signal is correctly connected. When an incorrect cable, such as the cable connection device 30 for the HD video signal, is connected, the output of the SD video signal is prohibited. Therefore, it is possible to prevent an incorrect video from being displayed in the HD monitor device 20. Further, in the SD video camera device 40, since the SD video camera device 40 displays an image on the display unit 408 such as a monitor or a view finder, the user can notice that the cable connection device 30 for the HD video signal is incorrectly connected to the SD video camera device 40.

Figure 17:
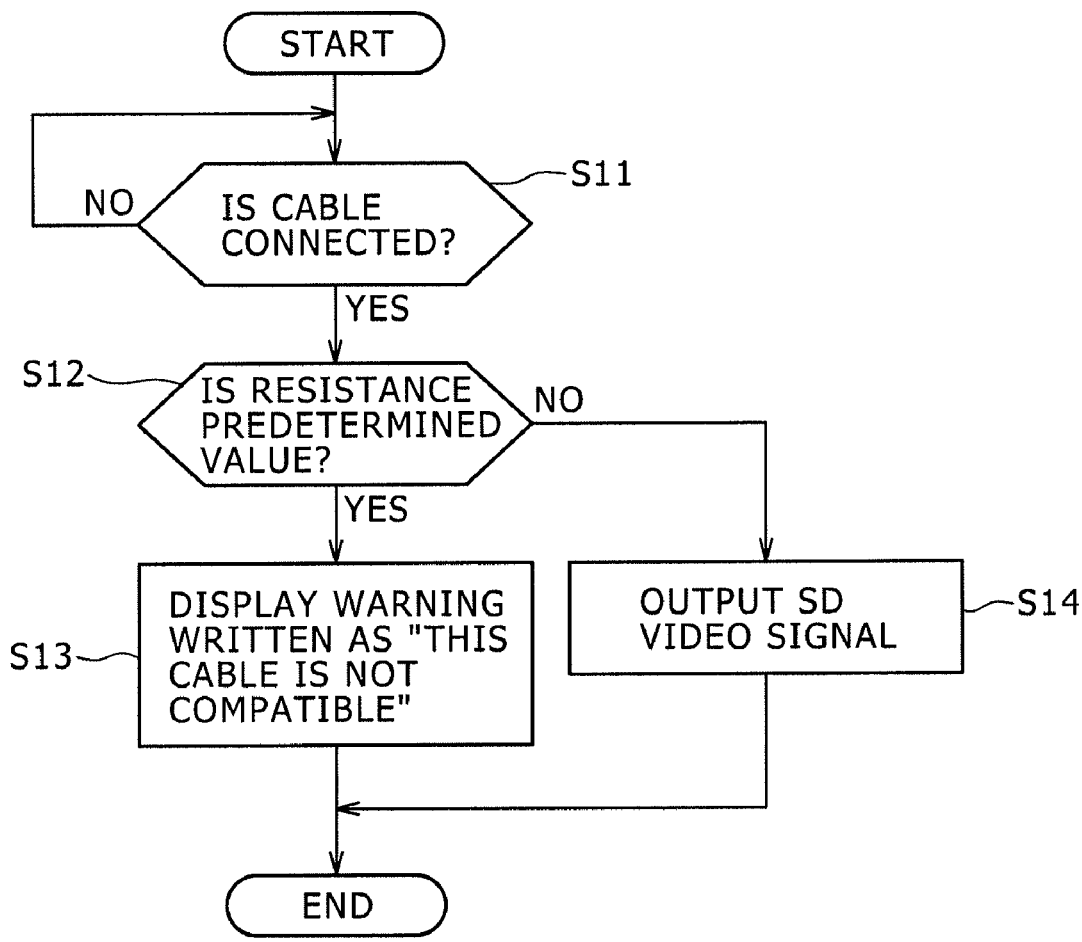
FIG. 17 is a flow chart showing processes from detecting the kind of cable connection device connected to the jack of the SD video camera device to outputting an SD video signal.

Further, referring to FIG. 17, when the multiplug 304 of the cable connection device 30 for the HD video signal is incorrectly connected to the jack 41, the SD video camera device 40 turns off the switch 406 to prohibit the output of the SD video signal. However, in this case, the output of the SD video signal may not be prohibited. In this case, as described below, a red image may be displayed on the HD monitor device 20. Since red is generally used to issue a warning, when the red image is displayed on the HD monitor device 20, the user can be warned that the cable connection device 30 for the HD video signal is incorrectly connected.

(5) Description of SD Video Camera Device of Related Art

An SD video camera device according to the related art has the configuration that the micro computer 405 and the warning data memory 404 are excluded from the SD video camera device 40 shown in FIG. 16. The other configuration is same as the SD video camera device shown in FIG. 16. That is, the jack of the output terminal that outputs the SD video signal is the same as the jack 41 of the above-described SD video camera device 40. Therefore, to the jack of the SD video camera device according to the related art, in addition to the multiplug 600 of the cable connection device 60 for the SD video signal, the multiplug 304 of the cable connection device 30 for the HD video signal that is connected to the HD monitor device 20 may be incorrectly connected.

Figure 18:
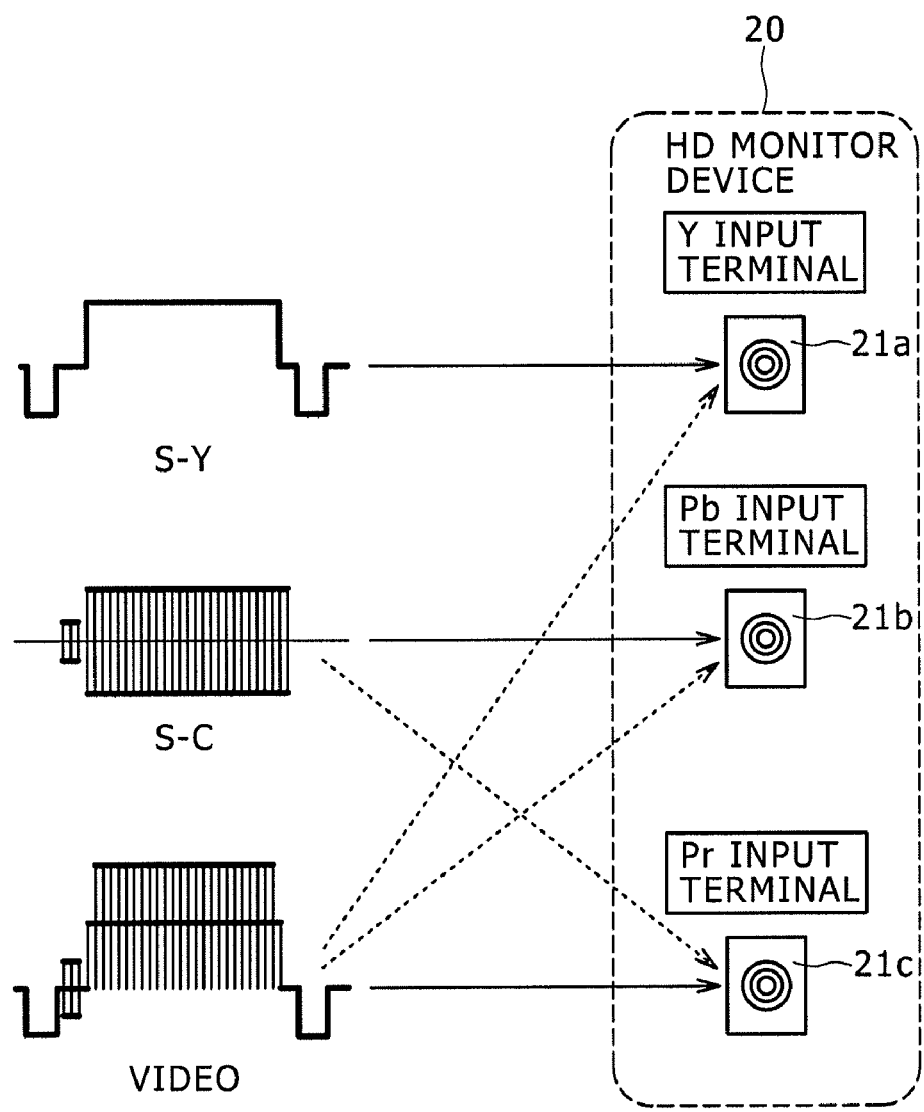
FIG. 18 is a diagram showing a relationship between an SD video signal and an HD component video signal.

When the multiplug 304 of the cable connection device 30 for the HD video signal is incorrectly connected to the jack of the SD video camera device according to the related art, as shown in FIG. 18, the SD video signal is input to the HD monitor device 20.

In this case, the cable connection device 30 for the HD video signal and the HD monitor device 20 are correctly connected. As a result, the SD video signals are input into the input terminals of the HD monitor device 20 as follows:

Brightness signal S-Y . . . brightness signal Y input terminal 21a of the HD monitor device 20

Color signal S-C . . . first color signal Pb input terminal 21b of the HD monitor device 20

Composite signal VIDEO . . . second color signal Pr input terminal 21c of the HD monitor device 20

Therefore, as shown in FIG. 18, the brightness signal Y input terminal 21a, the first color signal Pb input terminal 21b, and the second color signal Pr input terminal 21c of the HD monitor device 20 detect a synchronization signal sync.

Therefore, in the brightness signal Y input terminal 21a of the HD monitor device 20, since the synchronization signal sync is contained in the brightness signal S-Y of the SD video signal, the brightness signal S-Y of the SD video signal may be recognized as the brightness signal Y of the HD video signal.

Further, in the first color signal Pb input terminal 21b of the HD monitor device 20, even though the color signal S-C of the SD video signal is input, the synchronization signal sync is not contained. Therefore, the color signal SC is not recognized as the first color signal Pb, that is a blue component.

Furthermore, in the second color signal Pr input terminal 21c of the HD monitor device 20, the synchronization signal sync is contained in the composite signal VIDEO of the SD video signal. Therefore, the composite signal VIDEO of the SD video signal is recognized as the second color signal Pr of the HD video signal, that is a red component.

As a result, by recognizing the brightness signal Y and the second color signal Pr of the SD video signal, the HD monitor device 20 displays the red image. Since red is generally used to issue a warning, the user can be warned that the incorrect cable is connected by watching the HD monitor device 20.

Figure 19:
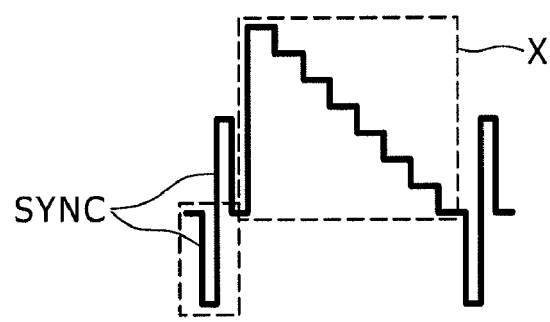
FIG. 19 is a diagram showing an amplitude of a video signal.

As shown in FIG. 19, when a synchronization signal having an amplitude that is larger than a predetermined width is input, the HD monitor device 20 recognizes the brightness signal Y, the first color signal Pb, and the second color signal Pr. Therefore, when the plug is incorrectly inserted between the cable connection device 30 for the HD video signal and the HD monitor device 20, the HD monitor device 20 can display colors other than red, as follows:

Brightness signal S-Y . . . brightness signal Y input terminal 21a of the HD monitor device 20

Color signal S-C . . . second color signal Pr input terminal 21c of the HD monitor device 20

Composite signal VIDEO . . . first color signal Pb input terminal 21b of the HD monitor device 20

In this case, since the composite signal VIDEO that has a synchronization signal is input to the first color signal Pb input terminal 21b, a blue screen is displayed on the HD monitor device 20. Even in this case, since an abnormal image is displayed on the HD monitor device 20, the user is warned that the incorrect cable is connected by watching the HD monitor device 20.

Further, as shown in FIG. 19, the HD monitor device 20 is configured such that as the amplitude of the brightness signal S-Y in the area X of the video signal becomes larger, the brighter image is displayed, and as the amplitude of the composite signal VIDEO becomes larger, the red or blue screen is displayed.

Further, the composite signal VIDEO is input to the brightness signal Y input terminal 21a of the HD monitor device 20, and the brightness signal S-Y is input to the first color signal Pb input terminal 21b or the second color signal Pr input terminal 21c. In this case, since the brightness signal Y input terminal 21a recognizes the chromatic component as a brightness signal, a flicker image is entirely displayed. Even in this case, since an abnormal image is displayed on the HD monitor device 20, the user may be warned that the incorrect cable is connected by watching the HD monitor device 20.

(6) Modification of Cable Connection Device 30 for HD Video Signal

Figure 20:
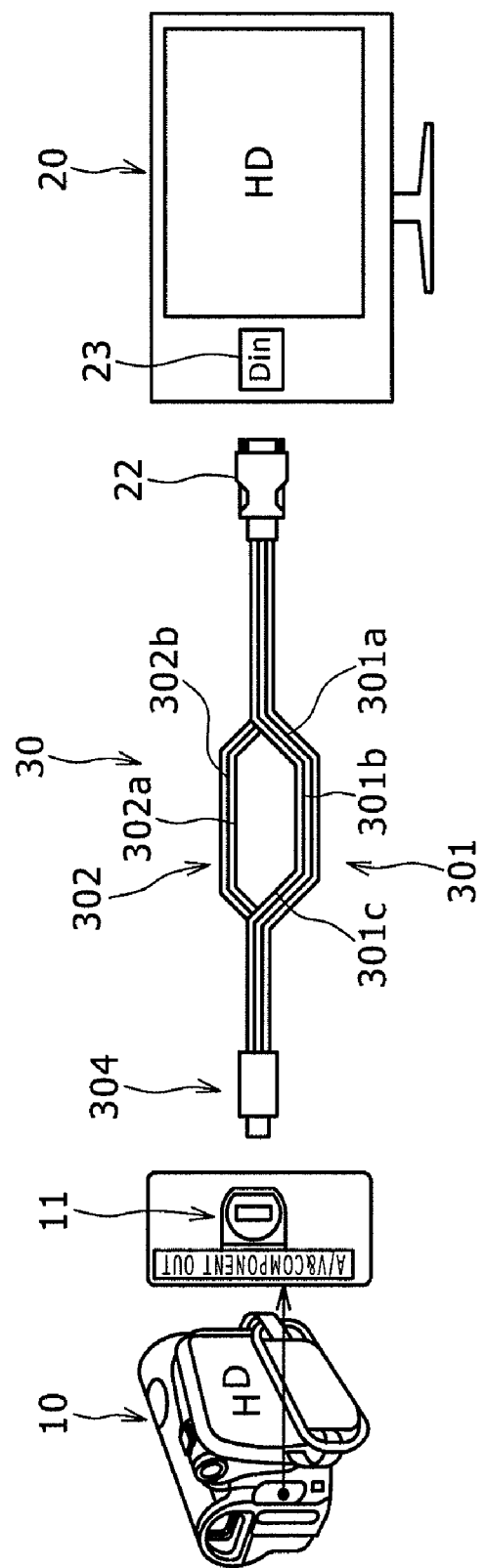
FIG. 20 is a diagram showing a modification of a cable connection device for an HD video signal.

In the above embodiment, even though the cable connection device 30 for the HD video signal is connected to the HD monitor device 20 by using the RCA plug, a D terminal plug 22 may be used to be connected to the HD monitor device as shown in FIG. 20. The D terminal plug 22 is connected to a D terminal 23 of the HD monitor device 20. With this arrangement, the HD component video signals Y, Pb, and Pr and the R channel and L channel audio signals can be received and transmitted by using one connector connection, which reduces the number of plugs as compared with the RCA.

It should be understood by those skilled in the art that various modifications, combinations, sub-combinations and alternations may occur depending on design requirements and other factors insofar as they are within the scope of the appended claims or the equivalents thereof.

What is claimed is:

1. A video device comprising:
a video signal processor generating a standard definition video signal at least having a composite signal and a high definition component video signal;
an outputting unit outputting the standard definition video signal or the high definition component video signal to a cable to be connected;
a discriminating unit discriminating a kind of cable connected to the outputting unit; and
a switch allowing the outputting unit to selectively output either the standard definition video signal or the high definition component video signal on the basis of the discrimination result of the discriminating unit,
wherein when the discriminating unit determines that the cable connected to the outputting unit is a cable for a high definition signal, the switch allows the outputting unit to output the high definition component video signal,
wherein: in a plug of the cable, a resistive element is connected between an identification terminal and a ground terminal; and
the discriminating unit discriminates the kind of cable connected to the outputting unit on the basis of the resistance of the resistive element,
wherein the high definition component video signal includes a brightness signal, a first color signal, and a second color signal,
wherein the brightness signal of the standard definition video signal and the brightness signal of the high definition component video signal are output from the same terminal.

2. The video device according to claim 1, wherein: the first color signal of the high definition component video signal is a Pb signal; and the color signal of the standard definition video signal and the first color signal of the high definition component video signal are output from the same terminal.

3. The video device according to claim 2, wherein: the second color signal of the high definition component video signal is a Pr signal; and the composite signal of the standard definition video signal and the second color signal of the high definition component video signal are output from the same terminal.

4. The video device according to claim 1, wherein a video signal output terminal and an audio signal output terminal of the outputting unit are disposed so as to face each other in an output terminal row.

5. An output switching method that discriminates the kind of cable connected to an outputting unit to selectively output either a standard definition video signal at least having a composite signal generated by a video signal processor or a high definition component video signal, the method comprising the steps of:
allowing a discriminating unit to discriminate the kind of cable connected to the outputting unit; and
when the discriminating unit discriminates that the cable connected to the outputting unit is a high definition cable, switching the outputting unit to output the high definition video signal,
wherein in a plug of the cable, a resistive element is connected between an identification terminal and a ground terminal; and
the discriminating unit discriminates the kind of cable connected to the outputting unit on the basis of the resistance of the resistive element,
wherein the high definition component video signal includes a brightness signal, a first color signal, and a second color signal,
wherein the brightness signal of the standard definition video signal and the brightness signal of the high definition component video signal are output from the same terminal.

6. A video device comprising:
a standard definition video signal processor generating a standard definition video signal at least having a composite signal;
an outputting unit outputting the standard definition video signal to a cable to be connected;
a discriminating unit discriminating a kind of cable connected to the outputting unit; and
a warning unit outputting warning data when an incorrect cable is connected to the outputting unit,
wherein when the discriminating unit determines that the cable connected to the outputting unit is an incorrect cable, the warning unit outputs the warning data,
wherein in a plug of the cable, a resistive element is connected between an identification terminal and a ground terminal; and
the discriminating unit discriminates the kind of cable connected to the outputting unit on the basis of the resistance of the resistive element,
wherein the high definition component video signal includes a brightness signal, a first color signal, and a second color signal,
wherein the brightness signal of the standard definition video signal and the brightness signal of the high definition component video signal are output from the same terminal.

7. The video device according to claim 6, wherein on the basis of a resistance between a plug identification terminal of the cable connected to the outputting unit and a ground terminal, the discriminating unit discriminates the kind of cable connected to the outputting unit.

8. The video device according to claim 7, wherein when the discriminating unit discriminates that the cable connected to the outputting unit is a cable that transmits the high definition component video signal on the basis of the resistance of the resistive element disposed between a plug identification terminal of the cable connected to the outputting unit and the ground terminal, the warning unit outputs the warning data.

9. A cable discriminating method that allows an outputting unit to output a standard definition video signal at least having a composite signal generated by a standard definition video signal processor and discriminates the kind of cable connected to the outputting unit, the method comprising the steps of:

discriminating the kind of cable connected to the outputting unit; and outputting warning data when it is discriminated that an incorrect cable is connected to the outputting unit, wherein in a plug of the cable, a resistive element is connected between an identification terminal and a ground terminal; and wherein the discriminating step discriminates the kind of cable connected to the outputting unit on the basis of the resistance of the resistive element, wherein the high definition component video signal includes a brightness signal, a first color signal, and a second color signal, wherein the brightness signal of the standard definition video signal and the brightness signal of the high definition component video signal are output from the same terminal.

10. The cable discriminating method according to claim 9, wherein the kind of cable connected to the outputting unit is discriminated on the basis of a resistance between a plug identification terminal of the cable connected to the outputting unit and a ground terminal.

11. The cable discriminating method according to claim 10, wherein when the cable connected to the outputting unit is discriminated to be a cable that transmits the high definition component video signal on the basis of the resistance between a plug identification terminal of the cable connected to the outputting unit and the ground terminal, the warning data is output.

* * * * *